United States Patent
Yerramalli et al.

(10) Patent No.: US 10,123,335 B2
(45) Date of Patent: Nov. 6, 2018

(54) QUALITY OF SERVICE RELATED ENHANCEMENTS FOR LTE OVER SHARED SPECTRUM

(71) Applicant: QUALCOMM Incorporated, San Diego, CA (US)

(72) Inventors: Srinivas Yerramalli, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 182 days.

(21) Appl. No.: 15/198,481

(22) Filed: Jun. 30, 2016

(65) Prior Publication Data

US 2017/0034831 A1 Feb. 2, 2017

Related U.S. Application Data

(60) Provisional application No. 62/199,138, filed on Jul. 30, 2015.

(51) Int. Cl.
*H04W 72/08* (2009.01)
*H04W 74/08* (2009.01)
*H04W 16/14* (2009.01)

(52) U.S. Cl.
CPC .......... *H04W 72/08* (2013.01); *H04W 16/14* (2013.01); *H04W 74/0808* (2013.01)

(58) Field of Classification Search
CPC .. H04W 72/08; H04W 74/0808; H04W 16/14
See application file for complete search history.

(56) References Cited

U.S. PATENT DOCUMENTS

| | | |
|---|---|---|
| 2008/0225783 A1 | 9/2008 | Wang et al. |
| 2015/0098397 A1 | 4/2015 | Damnjanovic et al. |
| 2015/0110066 A1 | 4/2015 | Gaal et al. |
| 2017/0325115 A1* | 11/2017 | Matsumoto ........... H04W 24/08 |
| 2017/0366308 A1* | 12/2017 | Choi ..................... H04L 1/1887 |

OTHER PUBLICATIONS

ISA/EP, International Search Report and Written Opinion of the International Searching Authority, Int'l Application No. PCT/US2016/040860, dated Sep. 12, 2016, European Patent Office, Rijswijk, NL, 9 pgs.

* cited by examiner

*Primary Examiner* — Rhonda L Murphy
(74) *Attorney, Agent, or Firm* — Holland & Hart LLP/Qualcomm

(57) ABSTRACT

Methods, systems, and devices are described for wireless communications. The described techniques include separation of communication resources into resource sets based on data service sets for multiple base stations operating over a carrier of a shared spectrum. The base stations may use synchronized communication time resources. Each data service set may include one or more QoS types and/or communication services. Listen before talk (LBT) parameters for contention procedures performed in different resource sets may be different. A UE configured for communication over the carrier may employ a resource set based discontinuous reception (DRX) mode where a sleep mode is entered for resource sets not associated with active communications by the UE. Channel state information (CSI) reporting may be separated by resource sets for the carrier.

24 Claims, 19 Drawing Sheets

QUALITY OF SERVICE RELATED ENHANCEMENTS FOR LTE OVER SHARED SPECTRUM

CROSS REFERENCES

The present application for patent claims priority to U.S. Provisional Patent Application No. 62/199,138 by Yerramalli, et al., entitled "QUALITY OF SERVICE RELATED ENHANCEMENTS FOR LTE OVER SHARED SPECTRUM," filed Jul. 30, 2015, and assigned to the assignee hereof.

BACKGROUND

Field of Disclosure

The following relates generally to wireless communication, and more specifically to quality of service (QoS) related enhancements for Long Term Evolution (LTE) operation over shared spectrum.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a first wireless multiple-access communication system may operate according to a radio access technology (RAT), such as LTE, and may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). A second wireless multiple-access communications system may operate according to a different RAT, such as Wi-Fi, and may include a number of base stations or access points (APs), each simultaneously supporting communication for multiple mobile devices or stations (STAs). APs may communicate with STAs on downstream and upstream links. In some cases both types of communication systems may operate in the presence of one another and may use shared resources.

In a wireless local area network (WLAN), such as Wi-Fi, an AP may communicate with multiple STAs over a shared radio frequency spectrum. The STAs may use contention procedures such as listen before talk (LBT) that include a clear channel assessment (CCA) procedure to determine whether a channel of the shared radio frequency spectrum is available. The contention procedures may also involve communicating one or more control frames prior to establishing a communication link, such that confirmation of the communication link via exchange of control frames limits interference experienced by nearby communication devices. One example of such techniques include Request to Send (RTS) and Clear to Send (CTS) messaging, where, for example, a STA looking to communicate with another device (e.g., another STA or AP), may first send an RTS frame to the device. Once the recipient device receives the RTS frame, the recipient device may confirm the communication link by sending a CTS frame. After the CTS frame is received by the STA, the STA may then begin transmitting data to the recipient device. In this way, RTS/CTS messaging can reduce frame collisions by enabling a device, such as a STA or AP, to in essence clear the communication path before transmitting data to an AP or STA.

In an LTE network, a base station may communicate with UEs over carriers in a dedicated frequency spectrum (e.g., operator-licensed frequency band) using a multiple access technique where resources of the carrier are centrally allocated by the base station. With increasing data traffic in cellular networks that use a dedicated (e.g., licensed) radio frequency band, offloading of at least some data traffic to a shared (e.g., unlicensed) radio frequency spectrum may provide a cellular operator with opportunities for enhanced data transmission capacity. A shared radio frequency spectrum may also provide service in areas where access to a dedicated radio frequency spectrum is unavailable. An LTE device that is capable of operating in shared frequency spectrum using LTE-based transmission protocols may be considered to be an LTE-Unlicensed (LTE-U) device.

Prior to gaining access to and communicating over a shared radio frequency spectrum, an LTE-U base station or UE may perform an LBT procedure compatible with contention procedures used by Wi-Fi devices to gain access to the shared radio frequency spectrum. Thus, LTE-U and Wi-Fi devices contending for access to the same shared radio frequency spectrum may each be able to transmit and receive communications while mitigating interference from other users.

In some cases, a network employing LTE-U operation may have multiple base stations within a geographic area that may be deployed in various configurations. For example, based on their separation distance, transmissions from one base station over a carrier of a shared spectrum may or may not cause a neighboring base station to detect the carrier as busy. Additionally, a network operator can tune transmission power to mitigate interference between neighboring base stations. However, the network deployment may not take into account other users of the shared spectrum and challenges may occur in managing interference between base stations employing LTE-U operation and other users.

SUMMARY

Methods, systems, and devices are described for enhancements to resource management based on Quality of Service (QoS) or communication service for networks employing LTE-U. The described techniques include separation of communication resources into resource sets based on data service sets for multiple base stations operating over a carrier of a shared spectrum. The base stations may use synchronized communication time resources. Each data service set may include one or more QoS types and/or communication services. Listen before talk (LBT) parameters for contention procedures performed in different resource sets may be different. A UE configured for communication over the carrier may employ a resource set based discontinuous reception (DRX) mode where a sleep state is entered for resource sets not associated with active communications by the UE. Channel state information (CSI) reporting may be separated by resource sets for the carrier.

A method of wireless communication is described. The method may include identifying, at a base station of a plurality of base stations, a resource allocation pattern for the plurality of base stations, wherein the resource allocation pattern groups communication time resources of a carrier in a shared spectrum into a plurality of resource sets associated with different data service sets, identifying a first resource set associated with a first data service set of the different data service sets, and communicating, with at least one user equipment, first data traffic associated with the first data service set over the first resource set.

An apparatus for wireless communication is described. The apparatus may include means for identifying, at a base station of a plurality of base stations, a resource allocation pattern for the plurality of base stations, wherein the resource allocation pattern groups communication time resources of a carrier in a shared spectrum into a plurality of resource sets associated with different data service sets, means for identifying a first resource set associated with a first data service set of the different data service sets, and means for communicating, with at least one user equipment, first data traffic associated with the first data service set over the first resource set.

A further apparatus for wireless communication is described. The apparatus may include a processor, memory in electronic communication with the processor, and instructions stored in the memory and operable, when executed by the processor, to cause the apparatus to identify, at a base station of a plurality of base stations, a resource allocation pattern for the plurality of base stations, wherein the resource allocation pattern groups communication time resources of a carrier in a shared spectrum into a plurality of resource sets associated with different data service sets, identify a first resource set associated with a first data service set of the different data service sets, and communicate, with at least one user equipment, first data traffic associated with the first data service set over the first resource set.

A non-transitory computer-readable medium storing code for wireless communication is described. The code may include instructions executable to identify, at a base station of a plurality of base stations, a resource allocation pattern for the plurality of base stations, wherein the resource allocation pattern groups communication time resources of a carrier in a shared spectrum into a plurality of resource sets associated with different data service sets, identify a first resource set associated with a first data service set of the different data service sets, and communicate, with at least one user equipment, first data traffic associated with the first data service set over the first resource set.

In some examples of the method, apparatuses, or non-transitory computer-readable medium described herein, the communicating comprises determining a listen before talk (LBT) parameter based at least in part on the first data service, performing a clear channel assessment (CCA) over the carrier based at least in part on the LBT parameter, and transmitting the first data traffic over the first resource set based at least in part on determining that a successful CCA has been performed. The LBT parameter may include any of a contention window size, a deferral period, a contention window adaptation scheme, an energy detection threshold, a parameters associated with an Internet of Things resource set or any combination thereof. Some examples may include activating a type of HARQ process for the communicating of the first data traffic based on the first data service set.

In some examples of the method, apparatuses, or non-transitory computer-readable medium described herein, the communicating comprises receiving the first data traffic over the first resource set. Additionally or alternatively, in some examples the identifying the resource allocation pattern comprises receiving the resource allocation pattern from a network device associated with the plurality of base stations.

Some examples of the method, apparatuses, or non-transitory computer-readable medium described herein may further include processes, features, means, or instructions for broadcasting the resource allocation pattern to a radio access network, wherein the radio access network is associated with the plurality of base stations. Additionally or alternatively, some examples may include processes, features, means, or instructions for transmitting, to the at least one user equipment, the resource allocation pattern.

In some examples of the method, apparatuses, or non-transitory computer-readable medium described herein, the communication time resources are any of a frame, a sub-frame, a symbol period, or a transmission time interval (TTI). Additionally or alternatively, in some examples each resource set comprises a plurality of contiguous communication time resources.

Some examples of the method, apparatuses, or non-transitory computer-readable medium described herein may further include processes, features, means, or instructions for identifying a second resource allocation pattern for the plurality of base stations, wherein the second resource allocation pattern groups second communication time resources of a second carrier in the shared spectrum into a second plurality of resource sets associated with one or more of the different data service sets, wherein the second plurality of resource sets are allocated differently than the plurality of resource sets.

In some examples of the method, apparatuses, or non-transitory computer-readable medium described herein, the communication time resources are synchronized for the plurality of base stations. Additionally or alternatively, in some examples each of the different data service sets is associated with any of one or more quality of service (QoS) identifiers, one or more service type identifiers, or a combination thereof.

A method of wireless communication is described. The method may include identifying a resource allocation pattern for a carrier in a shared spectrum, wherein the resource allocation pattern groups communication time resources of the carrier into a plurality of resource sets associated with different data services, identifying a first resource set associated with a first data service of the different data services, and communicating, with a base station associated with the carrier, first data traffic that is associated with the first data service over the first resource set.

An apparatus for wireless communication is described. The apparatus may include means for identifying a resource allocation pattern for a carrier in a shared spectrum, wherein the resource allocation pattern groups communication time resources of the carrier into a plurality of resource sets associated with different data services, means for identifying a first resource set associated with a first data service of the different data services, and means for communicating, with a base station associated with the carrier, first data traffic that is associated with the first data service over the first resource set.

A further apparatus for wireless communication is described. The apparatus may include a processor, memory in electronic communication with the processor, and instructions stored in the memory and operable, when executed by the processor, to cause the apparatus to identify a resource allocation pattern for a carrier in a shared spectrum, wherein the resource allocation pattern groups communication time resources of the carrier into a plurality of resource sets associated with different data services, identify a first resource set associated with a first data service of the different data services, and communicate, with a base station associated with the carrier, first data traffic that is associated with the first data service over the first resource set.

A non-transitory computer-readable medium storing code for wireless communication is described. The code may include instructions executable to identify a resource allocation pattern for a carrier in a shared spectrum, wherein the resource allocation pattern groups communication time resources of the carrier into a plurality of resource sets associated with different data services, identify a first resource set associated with a first data service of the different data services, and communicate, with a base station associated with the carrier, first data traffic that is associated with the first data service over the first resource set.

In some examples of the method, apparatuses, or non-transitory computer-readable medium described herein, the communicating comprises monitoring a channel associated with the carrier during the first resource set for the first data traffic. Additionally or alternatively, some examples may include processes, features, means, or instructions for entering a sleep state during one or more resource sets of the plurality of resource sets.

In some examples of the method, apparatuses, or non-transitory computer-readable medium described herein, the entering the sleep state comprises disabling a receiver during the one or more resource sets of the plurality of resource sets. Additionally or alternatively, some examples may include processes, features, means, or instructions for reporting one or more channel quality indicator (CQI) measurements for respective resource sets of the plurality of resource sets, wherein the reported CQI measurements are based at least in part on channel state information (CSI) resources associated with the respective resource sets.

In some examples of the method, apparatuses, or non-transitory computer-readable medium described herein, the identifying the first data service comprises any of identifying an active bearer associated with the first data service, identifying an active service associated with the first data service, or a combination thereof.

Some examples of the methods, apparatuses, or non-transitory computer-readable media described herein may further include processes, features, means, or instructions for quality of service related enhancements for LTE-U. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques for enhancements to resource management based on Quality of Service (QoS) or communication service type for networks employing Long Term Evolution-Unlicensed (LTE-U) are described. A resource allocation pattern may be designated for multiple base stations operating within a geographic area. The resource allocation pattern may group communication time resources into resource sets that are associated with different data service sets. The base stations may use synchronized communication time resources. Each data service set may include one or more QoS types and/or communication service types. Listen before talk (LBT) parameters for contention procedures performed in different resource sets may be different. Each base station may identify the resource allocation pattern (e.g., via backhaul links or broadcast communications, etc.) and the resource sets (e.g., a number of contiguous communication time resources) that are associated with the different data service sets. Each base station may then maintain data queues per data service set and communicate the queued data during corresponding resource sets. Time-aligned CCA procedures per data service set may result in higher frequency re-use by the multiple base stations and increased efficiency of communications over the carrier.

A UE configured for communication over the carrier may receive and identify the resource allocation pattern and identify which resource sets correspond to data service sets used for communication by the UE. The UE may then communicate data of different types with a base station during the corresponding resource sets. The UE may employ a resource set based discontinuous reception (DRX) mode where a sleep mode is entered for resource sets not associated with active communications by the UE. Channel state information (CSI) reporting may be separated by resource sets for the carrier.

Figure 1:
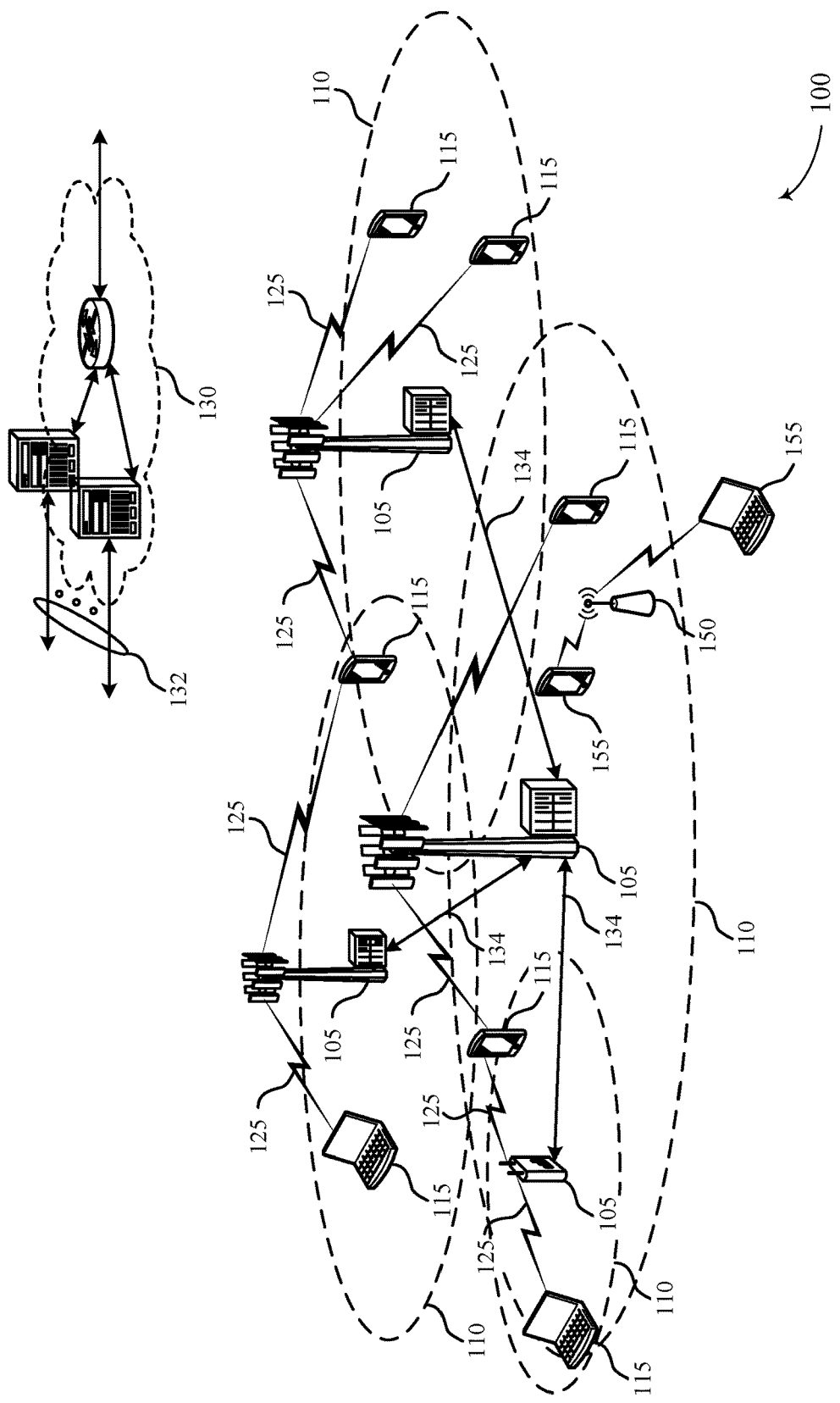
FIG. 1 illustrates an example of a wireless communications system that supports quality of service related enhancements for LTE-U in accordance with various aspects of the present disclosure.

FIG. 1 illustrates an example of a wireless communications system 100 that supports quality of service related enhancements for LTE-U in accordance with various aspects of the present disclosure. The wireless communications system 100 includes a multiple access network associated with a network operator including base stations 105 and UEs 115. The base stations may communicate with each other via a core network 130. In some examples, the multiple access network may be an LTE/LTE-Advanced (LTE-A) network. The wireless communications system 100 may also include a wireless local area network (WLAN) including APs 150 and STAs 155 that may communication using Wi-Fi.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may communicate with one another. For example, the base stations 105 may interface with the core network 130 through backhaul links 132 (e.g., S1, etc.) or by broadcasting information to the radio access network. The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In some examples, the base station controller may provide a resource allocation pattern to the base stations 105. The resource allocation pattern may group communication resources for the base stations 105 into resource sets and may facilitate synchronization between transmission from the base stations 105. In various examples, base stations 105 may be macro cells, small cells, hot spots, or the like. The base stations 105 may also be referred to as eNodeBs (eNBs) in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may support fast recovery procedures.

A UE 115 may be configured with multiple carriers in carrier aggregation (CA) configuration, and the communication links 125 may represent such multicarrier CA configurations. A carrier may also be referred to as a component carrier (CC), a layer, a channel, etc. The term "component carrier" may refer to each of the multiple carriers utilized by a UE in CA operation, and may be distinct from other portions of system bandwidth. For instance, a CC may be a relatively narrow-bandwidth carrier susceptible of being utilized independently or in combination with other component carriers. Each CC may provide the same capabilities as an isolated carrier. Multiple component carriers may be aggregated or utilized concurrently to provide some UEs 115 with greater bandwidth and, e.g., higher data rates. Thus, individual CC may be backwards compatible with legacy UEs 115 (e.g., UEs 115 implementing LTE release 8 or release 9); while other UEs 115 (e.g., UEs 115 implementing release 10+ LTE versions), may be configured with multiple component carriers in a multicarrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations 105 simultaneously on different carriers. Each cell of a base station 105 may include an UL CC and a DL CC. The coverage area 110 of each serving cell for abase station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, wireless communications system 100 may utilize one or more enhanced component carriers (eCCs). An enhanced component carrier (eCC) may be characterized by one or more features including: wider bandwidth, shorter symbol duration, shorter transmission time interval (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or multiple-operator spectrum (e.g., where more than one operator is licensed or allowed to use the spectrum). As used herein, "shared spectrum" refers to unlicensed spectrum, multiple-operator spectrum, or spectrum that has a primary user or operator, but allows opportunistic access by other users. An eCC characterized by wide bandwidth may include one or more segments that may be utilized by UEs 115 that are not capable of monitoring the whole bandwidth or prefer to use a limited bandwidth (e.g., to conserve power). An eCC may utilize dynamic time division duplex (TDD) operation (i.e., it may switch from downlink (DL) to uplink (UL) operation for short bursts according to dynamic conditions). In some cases, an eCC may utilize shorter TTIs (e.g., 1 symbol TTI, 2 symbol TTI, etc.) for UL and DL transmissions.

In some examples, the multiple access network of base stations 105 and UEs 115 may operate according to a first radio access technology (e.g., a cellular radio access technology, such as an LTE/LTE-A technology), but operate in the presence of one or more networks or nodes operating according to a second radio access technology (e.g., a Wi-Fi technology). By way of example, FIG. 1 shows a network comprised of a Wi-Fi access point (AP) 150 in communication with Wi-Fi stations (STAs) 155. In some examples, a UE 115 or base station 105 may be an LTE-U device that supports operation in unlicensed bands used by Wi-Fi. A STA 155 or AP 150 may be Wi-Fi devices that may support LTE but may not be configured for LTE-U operation. In the interest of clarity, LTE-U devices will be referred to as base stations 105 or UEs 115, while non LTE-U devices will be referred to as APs 150 or STAs 155.

An LTE-U device, such as a base station 105 or UE 115, may utilize a single CC for communications over dedicated or shared spectrum (e.g., in a standalone mode). Additionally or alternatively, the LTE-U device may utilize multiple CCs, such as a PCC (e.g., associated with dedicated spectrum) and an SCC (e.g., associated with shared spectrum) for communications over dedicated or shared spectrum (e.g., in a license assisted mode). In some cases, a CC may be an eCC that supports one or more of short TTIs, shorter symbol durations, wider bandwidths, etc. An LTE-U device, such as a UE 115, may also transmit CSI feedback information to another LTE-U device, such as a base station 105, associated with a CC. The CSI may include channel quality information (CQI), rank indication (RI), or a precoding matrix indicator (PMI). This information may be used by the base station 105 to determine a modulation and coding scheme (MCS), rank, precoding scheme, and the like. The UE 115 may report CSI information either periodically or aperiodically via the CC. An LTE-U device using multiple CCs (e.g., in a license assisted mode) may transmit CSI reports on the primary CC for both the primary and secondary CCs using uplink resources allocated by a base station 105.

In some cases, a set of nearby base stations 105 may be supporting a large number of UEs 115. The base stations 105 may utilize the shared spectrum to offload traffic from the licensed spectrum and to serve the UEs 115 with increased throughput. Each UE 115 may request different types of data (e.g., voice, streaming, email, etc.) or services (e.g., enhanced multi-media broadcast multi-service (eMBMS), Internet of Things (IoT) services, etc.) from a serving base station 105. Each data type may be associated with a different quality of service (QoS) target, which the network may seek to satisfy to ensure a favorable user experience. Different services may additionally be associated with different data rates and/or reliability targets. The network may configure multiple bearers for a UE 115 to provide the different data and service types at a desired data rate. Each bearer may be associated with transmission parameters, such as a priority and a guaranteed bit rate (GBR), which may indicate a minimum bit rate for the bearer. The UE may request uplink resources according to queued uplink data (e.g., per bearer or group of bearers, etc.) and be allocated uplink resources. The UE 115 may use the transmission parameters to distribute the allocated uplink resources amongst the bearers.

Before transmitting over a shared channel, an LTE-U device, such as a base station 105 or a UE 115, may perform an LBT procedure to win control of the shared channel. An LBT procedure may include performing a CCA to determine if the shared channel is available based on LBT parameters (e.g., contention window size, deferral period, contention adaptation scheme, energy detection threshold, a parameter associated with an Internet of Things resource set etc.). The contention window size may correspond to a duration that a device waits before determining that a channel is clear and a deferral period may correspond to a duration (e.g., a random backoff period) during which a device defers further attempts to clear the channel. A contention adaptation scheme may relate to modifying the contention window size during a contention procedure. For instance, a device may decrease the contention window size after each failed CCA to increase the likelihood of accessing the channel. The energy detection threshold may correspond to the amount of energy detected over a channel during a CCA that indicates the channel is not clear. Changing the energy detection threshold may decrease or increase sensitivity to other transmissions over a carrier.

If the device determines the channel is available, it may transmit a preamble (e.g., Wi-Fi preamble, channel usage beacon (CUBS), etc.) to alert other devices that it is about to transmit over the channel. Otherwise, if the channel is not available, the device may refrain from transmitting over the channel. In some cases, the LBT parameters used for a CCA may be based on the data or service type associated with a following transmission. For instance, the contention window size and deferral period for communicating email data may be longer than the contention window or deferral period associated with voice data. In this way, a network may prioritize transmission of delay-sensitive information over other information.

Since each of the nearby LTE-U base stations 105 may be transmitting different types of data to different UEs using different LBT parameters, transmissions of neighboring base stations 105 are generally not aligned in time. Although a network operator can deploy base stations 105 in a known configuration and employ power limits to manage interference to communications within groups of neighboring base stations, these techniques do not take into account interference between the deployed base stations and other users of the shared spectrum.

The devices of wireless communications system 100 such as the base stations 105 or UEs 115 may be configured for enhancements to resource management based on Quality of Service (QoS) or communication service. A resource allocation pattern may be designated for multiple base stations operating within a geographic area. The resource allocation pattern may group communication time resources into resource sets that are associated with different data service sets. The base stations may use synchronized communication time resources. Each data service set may include one or more QoS types and/or communication service types. Listen before talk (LBT) parameters for contention procedures performed in different resource sets may be different. Each base station may identify the resource allocation pattern (e.g., via backhaul links or broadcast communications, etc.) and the resource sets (e.g., a number of contiguous communication time resources) that are associated with the different data service sets. Each base station may then maintain data queues per data service set and communicate the queued data during corresponding resource sets. Time-aligned CCA procedures per data service set may result in higher frequency re-use by the multiple base stations, increased efficiency of communications over the carrier, and simplification of handover procedures.

A UE configured for communication over the carrier may receive and identify the resource allocation pattern and identify which resource sets correspond to data service sets used for communication by the UE. The UE may then communicate data of different types with a base station during the corresponding resource sets. The UE may employ a resource set based discontinuous reception (DRX) mode where a sleep mode is entered for resource sets not associated with active communications by the UE. Channel state information (CSI) reporting may be separated by resource sets for the carrier.

Figure 2:
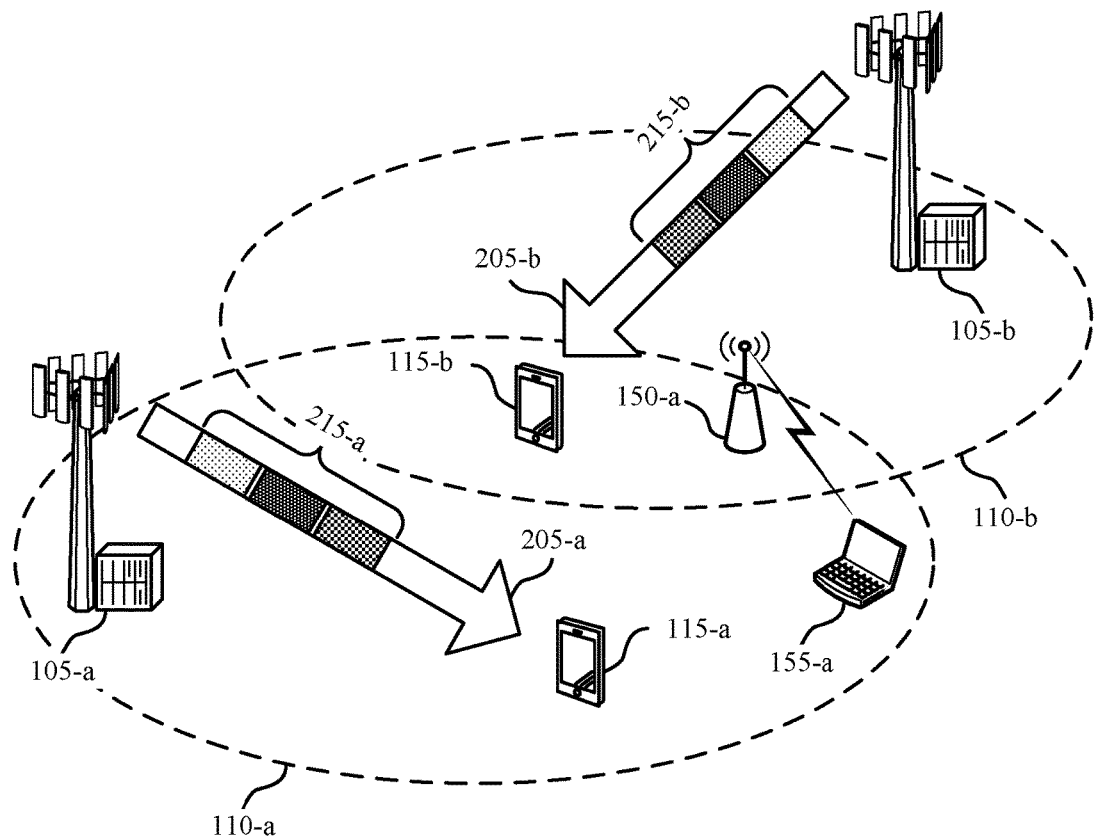
FIG. 2 illustrates an example of a wireless communications subsystem that supports quality of service related enhancements for LTE-U in accordance with various aspects of the present disclosure.

FIG. 2 illustrates an example of a wireless communications subsystem 200 that supports quality of service related enhancements for LTE-U in accordance with various aspects of the present disclosure. Wireless communications subsystem 200 may include UE 115-*a*, UE 115-*b*, base station 105-*a*, base station 105-*b*, and AP 150-*a*, which may be examples of a UE 115, a base station 105, or an AP 150 and may communicate with one another as described above with reference to FIG. 1. Wireless communications subsystem 200 may be a portion of wireless communications system 100 and in some cases may include additional base stations 105, UEs 115, APs 150, and STAs 155.

Base stations 105-*a* and 105-*b* may provide different data types and/or services to UEs 115 within wireless communications subsystem 200. The different data types (e.g., voice, SMS, video, streaming, email, chat, ftp, VoIP, etc.) may each be associated with a QoS class identifier (QCI), which in some examples may have indexes ranging from 1 to 9. Each QCI index may correspond to QoS parameters that prioritize transmissions, provide limits on packet delay, set bit error rate levels based on the designated QCI, etc. In some cases, one or more data types may be associated with one or more QCI indices (e.g., voice, video, and interactive gaming may all be associated with QCI_7, while video may also be associated with QCI_6, QCI_8, and QCI_9). Services provided to UEs 115 may include, for example eMBMS, MTC, D2D, and the like. MTC or D2D may include, for example, communication services for support of devices associated with an IoT. An IoT may describe a network of devices and objects embedded with electronics and wireless networking capabilities which enable communication between the devices and/or objects to exchange data.

In some cases, one or more data types and/or one or more data services may be semi-statically or dynamically grouped into data service sets (DSSs). In some cases, the grouping may be based on the QCI that is designated to the data types. For instance, a DSS may be configured to include data types that are associated with either QCI_8 and QCI_9. In another example, a DSS may be configured to include data types associated with QCI_8 along with data for an MTC service. In other cases, only one data type or service may be associated with a DSS. For example, a DSS may be configured to support an MTC service (e.g., an IoT network). In some cases, communications for MTC devices such as those associated with an IoT network may utilize coverage enhancement techniques such as repeating transmissions, and thus a conventional LBT procedure for each repeated instance of an IoT transmission may be inefficient. In some examples, LBT parameters for a DSS associated with an MTC service may be modified to improve MTC communication. For example, the LBT parameters for a DSS associated with an MTC service may include a reduced contention window size, reduced deferral period, increased energy detection threshold, or different contention window adaptation scheme (e.g., small linear step or no increase when contention detected, etc.). In some instances, non-CCA compliant transmissions may be allowed for a resource set associated with an MTC device DSS where interference from MTC transmissions is unlikely to result in substantial interference (e.g., narrow-band IoT).

Base stations 105-*a* may communicate with UE 115-*a* via communication link 205-*a*. Communication link 205-*a* may use shared resources to support transmissions between base station 105-*a* and UE 115-*a*. In some cases, communication link 205-*a* may include multiple CCs, a PCC and a SCC. The PCC may operate using dedicated spectrum (e.g., licensed spectrum) while the SCC may operate using shared spectrum (e.g., unlicensed or multiple-operator spectrum). This configuration may be associated with a licensed assisted access (LAA) mode. Alternatively, communication link 205-*a* may include a single CC that uses only the shared spectrum, in what may be referred to as a standalone mode. Communications over licensed spectrum (e.g., LTE transmissions) may be scheduled amongst devices that are licensed to use the spectrum, while communications over shared spectrum may compete with other devices (e.g., Wi-Fi transmissions). Since communications over shared spectrum are not scheduled at a central node, the communications may not be synchronized. The LTE-U devices, however, may partially synchronize transmissions over a shared channel according to DSSs. In one example, the LTE network may partition, for a group of base stations, resources for a carrier in shared spectrum into a number of resource sets. Each resource set may then be associated with a DSS and allocated resources that are dedicated to transmitting only data types that are included with the associated DSS.

In some cases, the types of data and/or services being requested by UEs 115 in wireless communications subsystem 200 may be identified, and a resource allocation pattern for the wireless communications subsystem 200 may be generated based on the identified data types and services. For instance, the resource allocation pattern may periodically allocate a number of subframes (e.g., the first 20 subframes) out of a total number of subframes (e.g., 80 subframes) to a certain DSS. In some cases, the DSSs are predetermined while in other cases they may be semi-statically or dynamically defined. The DSSs may be determined based on the types of data and/or service being requested by the UEs in the network. In other examples, the DSSs may be determined based on identifying common LBT parameters across multiple data types or services. In some cases, the requested types of data and services may be determined by a network controller (e.g., serving gateway, etc.), which may send the resource allocation pattern to base stations 105-*a* and 105-*b* and initiate a synchronous transmission mode across the wireless communications subsystem 200. In some cases, the synchronous transmission mode may be initiated during periods of high congestion levels (e.g., at a sporting event, concert, etc.).

Base stations 105-*a* and 105-*b* may identify communication resources associated with each DSS from the resource allocation pattern. Base stations 105-*a* and 105-*b* may also identify and group together data in a transmission queue that is associated with a DSS. Base stations 105-*a* and 105-*b* may then transmit data and services included in the DSS during the corresponding resource sets, as illustrated by transmissions 215-*a* and 215-*b*. The resource sets may be aligned in time for base stations 105-*a* and 105-*b*, and initialization of communications by base stations 105-*a* and 105-*b* associated with each DSS may be performed simultaneously (e.g., substantially synchronous or within a synchronization tolerance for mitigating inter-symbol interference, etc.). For example, CCA procedures for transmissions by base stations 105-*a* and 105-*b* for data associated with a DSS may begin simultaneously at the beginning of the associated resource set. Since both base stations 105-*a* and 105-*b* may transmit data in the resource set that is associated with the same data, the base stations 105-*a* and 105-*b* may use common LBT parameters for the CCA. Thus, even in cases where the base stations would detect the carrier as busy during transmissions from the other base station, both base station 105-*a* and 105-*b* may complete CCA procedures at the same time and determine that the channel is clear. Accordingly, both base stations 105-*a* and 105-*b* may begin transmitting the identified data to connected UE 115-*a* and UE 115-*b*, respectively.

Substantially simultaneous transmissions by base stations 105-*a* and 105-*b* may increase frequency reuse for the network. For instance, by enabling both base station 105-*a* and 105-*b* to transmit at the same time, AP 150-*a* may begin transmissions at the completion of the latest transmission from base station 105-*a* and base station 105-*b* as opposed to waiting for separate transmissions by both base station 105-*a* and 105-*b*. Simultaneous transmission may also increase the likelihood that Wi-Fi devices such as AP 150-*a* and STA 155-*a* detect LTE-U transmissions and may more effectively clear the network for LTE-U operations. Additionally, synchronous transmissions may improve interference cancellation between LTE-U devices. For instance, UE 115-*a* may use reference signals received from base station 105-*b* to cancel interference caused by the corresponding transmission.

In some cases, base stations 105-*a* and 105-*b* may broadcast the resource allocation pattern over the network to other base stations in the network and UEs, such as UE 115-*a* and UE 115-*b*. In one example, UE 115-*a* and UE 115-*b* may receive the resource allocation pattern and identify which resource sets are associated with which data service set. UE 115-*a* and UE 115-*b* may then identify data types or services that have been requested or that are active and may identify the corresponding resource sets. UE 115-*a* and UE 115-*b* may also identify data types or services that have not been requested or that are not supported and the corresponding resource sets. UE 115-*a* and UE 115-*b* may use this information for data service set dependent DRX operation, during which UE 115-*a* and UE 115-*b* may enter a sleep state during resource sets associated with inactive data types and services. UE 115-*a* and UE 115-*b* may additionally transition to an on state to monitor resource sets during resource sets associated with active data types and services. Furthermore, UE 115-*a* and UE 115-*b* may report CSI for the identified resource sets. For instance, UE 115-*a* may associate CSI measurements taken during the first resource set with a CSI report for the first resource set. In some cases, UE 115-*a* may average or otherwise process previous and current CSI measurements associated with the first resource set for a CSI report. UE 115-*a* may similarly determine CSI measurements for the other configured resource sets.

Figure 3A:
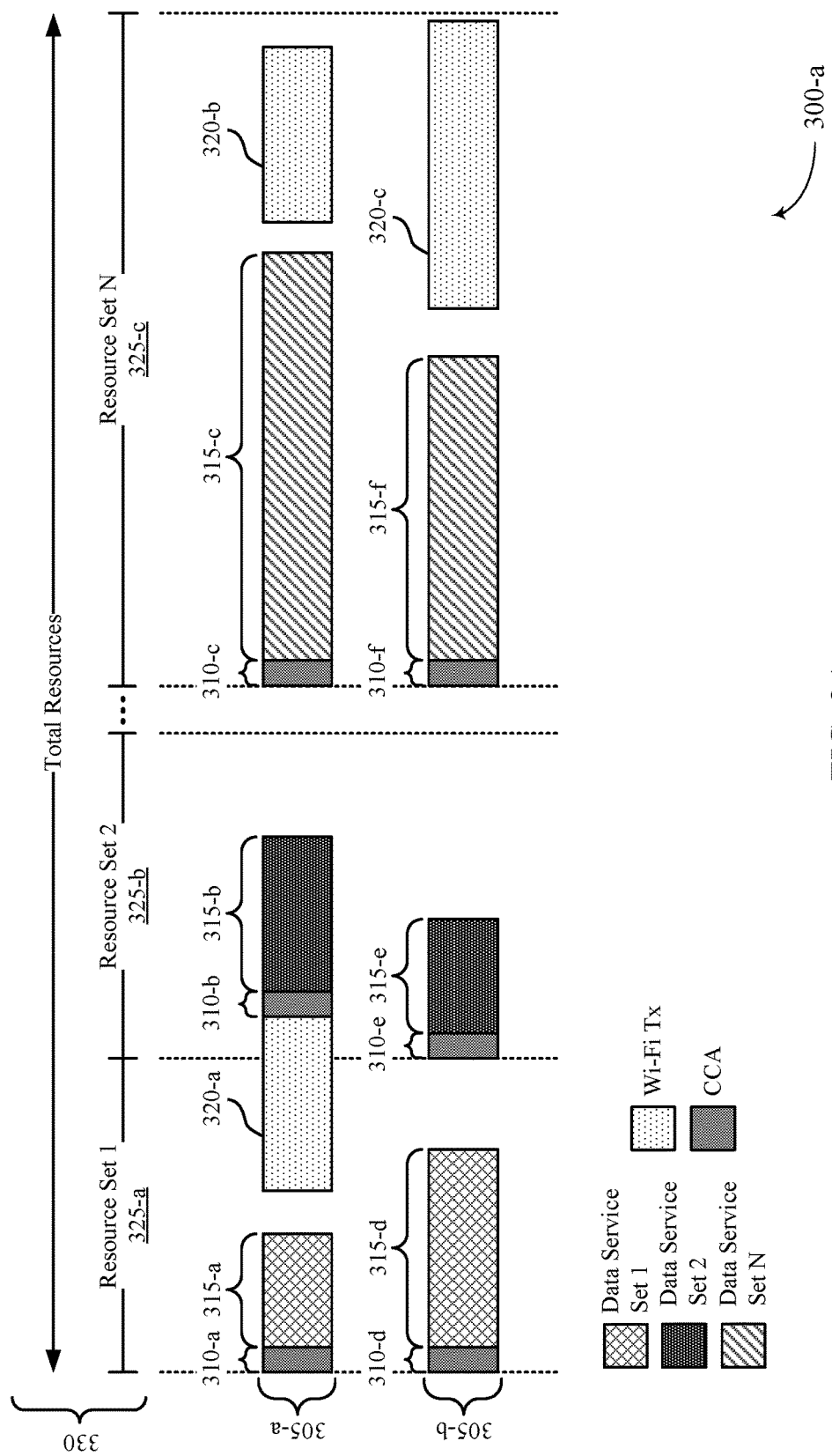
FIGS. 3A and 3B illustrate examples of a transmission scheme for quality of service related enhancements for LTE-U in accordance with various aspects of the present disclosure.
Figure 3B:
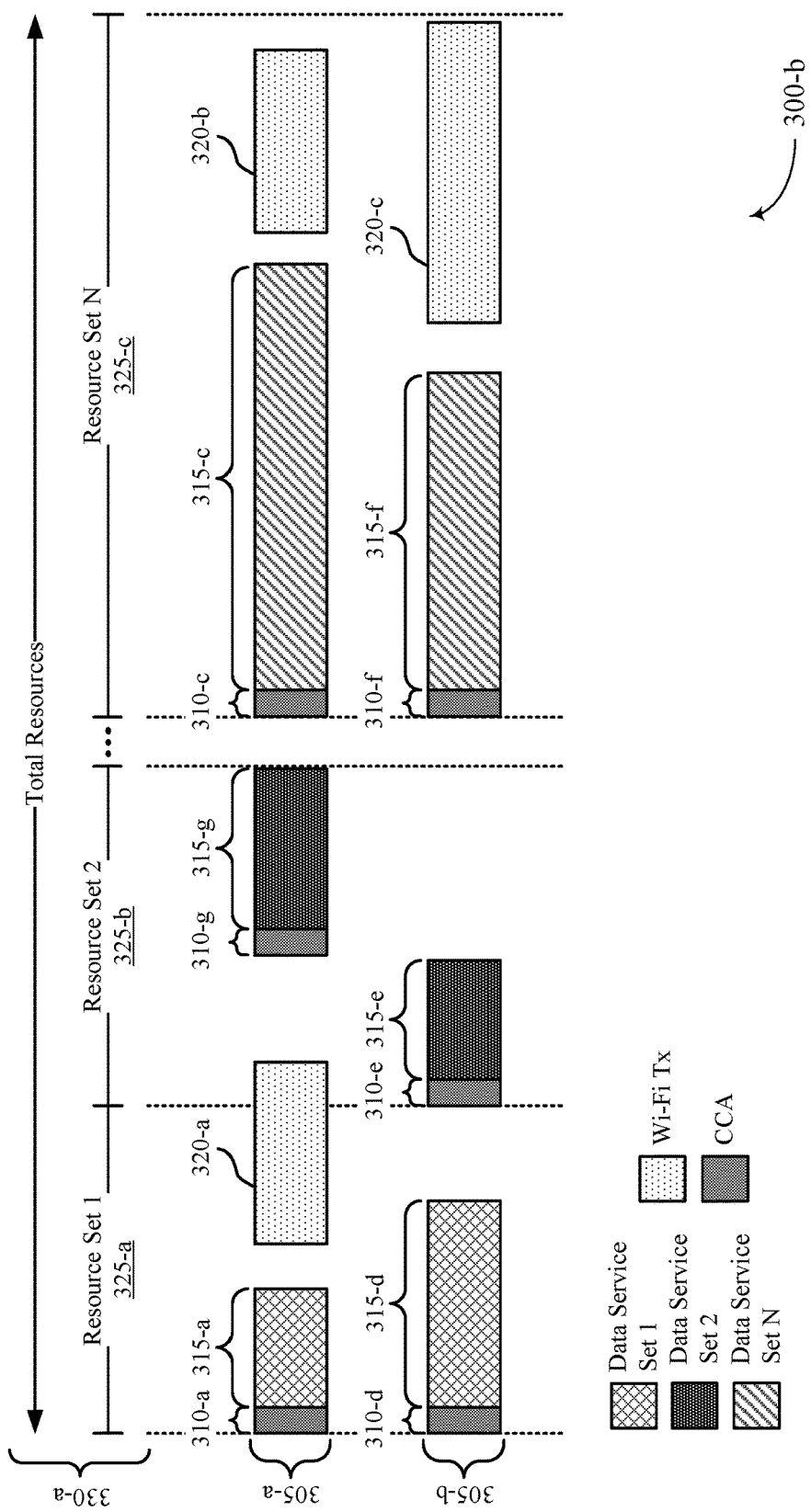

FIGS. 3A and 3B illustrate examples of a transmission schemes for quality of service related enhancements for LTE-U in accordance with various aspects of the present disclosure. For example, FIGS. 3A and 3B may illustrate aspects of transmissions by neighboring base stations 105 over a carrier in a shared spectrum, as described above with reference to FIGS. 1-2. The illustrated transmission streams 305 show CCAs 310, data transmissions 315, and interfering transmissions 320 (e.g., time periods for which the corresponding base station 105 detects the carrier medium as busy). Transmissions from a Wi-Fi device may be an example of an interfering transmission 320, which may also be referred to as a Wi-Fi Tx 320 in the following discussion.

A CC that operates over shared spectrum may be partitioned in the time domain so that multiple base station may use synchronized time partitions. In some cases, the CC may be divided into resource segments that consist of a predetermined number of resources (e.g., 80 subframes, 100 subframes, etc.). The resource segments may further be separated into resource sets 325-*a* to 325-*c*, which may each correspond to a data service set that includes at least one data type (e.g., voice) and/or service (e.g., eMBMS). The number of resources allocated to a resource set 325 may be based on a provided resource allocation pattern 330. A base station may transmit data that is associated with a DSS during a corresponding resource set 325. In some cases, a DSS may include multiple data types and/or services that are associated with common LBT parameters. The resources may be aligned in time across a group of base stations so that each resource set 325-*a* to 325-*c* may have common start and end points for each base station.

A resource set 325 may also be associated with a certain type of HARQ process. In some cases, the HARQ process that is used for the resource set 325 is based on the DSS that is associated with the resource set 325. As an example, a base station may use a standard HARQ process for data communicated during a first resource set 325-*a* that is associated with DSS_1, a soft HARQ process for data communicated during a second resource set 325-*b* that is associated with DSS_2, and may deactivate HARQ for data communicated during a third resource set 325-*c* that is associated with DSS_N. Additionally or alternatively, HARQ acknowledgements may be bundled or multiplexed per resource set 325. For example, a UE 115 may transmit a single control message for all transmissions received from a base station 105 during a resource set 325. The control message may include multiple ACK/NACK bits corresponding to respective transmissions during the resource set 325, or a single ACK/NACK bit with bundled acknowledgement information for the multiple transmissions.

Since each resource set 325-*a* to 325-*c* is associated with a respective DSS, each base station may perform similar CCA procedures for transmissions over a resource set 325. Therefore, at the beginning of each resource set 325-*a* to 325-*c*, each base station may perform a CCA with the same contention window, deferral period, contention window adaptation scheme, or energy detection threshold as each other base station. The base stations that do not detect that the channel is busy may begin synchronous data transmissions of data included in the DSS. Base stations that do identify the channel is busy may continue to perform CCA procedures until the channel is clear and then may begin data transmissions. Base stations that utilize the same contention window and contention window adaptation scheme may perform subsequent CCAs synchronously, and may therefore transmit subsequent data synchronously after identifying a clear channel.

FIG. 3A shows a transmission scheme 300-*a* in a base station deployment where transmissions from one base station do not prevent another base station from performing a successful CCA. For example, the first base station and the second base station may be far enough apart that transmissions from one base station do not prevent a successful CCA at the other. Additionally or alternatively, a base station may set the CCA threshold to a level that is not exceeded by transmissions from nearby base stations.

Multiple base stations that use common carriers (e.g., carriers that use the same frequency and time resources) in a shared spectrum may receive resource allocation pattern 330 for one or more of the common carriers. The base stations may identify that resource set 325-*a* is associated with DSS_1 and may also identify the resources that are allocated to resource set 325-*a*. The base stations may then identify whether data that is included in DSS_1 is also located in a transmission queue at the base station. In one example, after identifying that data associated with DSS_1 is waiting to be transmitted, a first base station associated with transmission stream 305-*a* may perform CCA 310-*a* at the beginning of resource set 325-*a* to determine if the shared channel is occupied. After identifying that the shared channel is clear, the first base station may begin data transmission 315-*a*, which may include data and/or services included in DSS_1.

A second base station may also receive and identify the resource allocation pattern 330 for transmission stream 305-*b*. The second base station may additionally identify whether data included with DSS_1 is located in the transmission queue. After identifying that data for DSS_1 is in the transmission queue, the second base station may perform CCA 310-*d* at the beginning of resource set 325-*a* and begin data transmission 315-*d* after identifying the channel is clear. Since both data transmissions 315-*a* and 315-*d* are associated with common LBT parameters and because the resources allocated to resource set 325-*a* are aligned in time across both base stations, the CCAs 310-*a* and 310-*d* may also be synchronized and have the same duration. In this example, both CCAs 310-*a* and 310-*d* clear on the first attempt and data transmissions 315-*a* and 315-*d* are also synchronized.

In subsequent data transmissions 315, interference from other devices may prevent synchronized transmissions for resource set 325-*b*. For instance, Wi-Fi Tx 320-*a* may overlap with the beginning of resource set 325-*b* and may be detected as an interfering transmission at the first base station (having a signal level above the CCA threshold) but not at the second base station. Accordingly, CCAs 310-*b* and 310-*e* and data transmissions 315-*b* and 315-*e* may occur at different times. In subsequent resource set 325-*c*, the base stations may again perform synchronous CCAs 310-*c* and 310-*f* and data transmissions 315-*c* and 315-*f*. In this example, neither base station utilizes all of the resources allocated to resource set 325-*c* and the remaining resources are used for Wi-Fi Tx 320-*b* and 320-*c*.

FIG. 3B shows another example of a transmission scheme 300-*b* for a deployment where transmissions from the base station associated with transmission stream 305-*b* may prevent a successful CCA at the base station associated with transmission stream 305-*a*. The base stations may similarly perform CCA procedures and perform transmissions based on a resource allocation pattern 330-*a*. During resource set 325-*b* the base station associated with transmission stream 305-*b* may identify the channel is clear via CCA 310-*e* and begin data transmission 315-*e*, while the second base station associated with transmissions stream 305-*a* may determine the channel is not clear at the start of resource set 325-*b*, due to Wi-Fi TX 320-*a*. The second base station may continue CCA procedures until data transmission 315-*e* has ended and may determine the channel is clear during CCA 310-*g* and begin data transmissions 315-*g*. In some cases, data transmission 315-*g* may be shortened with respect to data transmissions 315-*b* of FIG. 3A. For example, data transmission 315-*g* may be configured to terminate at or before the end of the second resource set 325-*b*.

Although FIGS. 3A and 3B show transmissions streams 305 from base stations 105, similar techniques may be used for uplink transmissions. For example, a resource allocation pattern may be defined for an uplink carrier in shared spectrum, or a resource allocation pattern may be defined for a TDD carrier (e.g., a resource allocation pattern for a TDD carrier may include a resource set 325 for UE-initiated transmissions). That is, a service type for a DSS may include UE-initiated uplink transmissions. Thus, UEs may transmit using resources allocated by base station grants in some resource sets, while other resource sets may allow UEs to initiate transmissions even when not provided a resource grant in the resource set.

In some cases, one or more of the base stations may identify a second resource allocation pattern for a second carrier in the shared spectrum. The second resource allocation pattern may allocate resource sets differently than the first resource allocation pattern. For instance, a DSS may be allocated a different amount of resources on the second carrier, or different DSSs may be allocated resources on different carriers (e.g., some DSSs may be allocated resources on only one of two carriers while other DSSs are allocated resources on both carriers, etc.).

Figure 4:
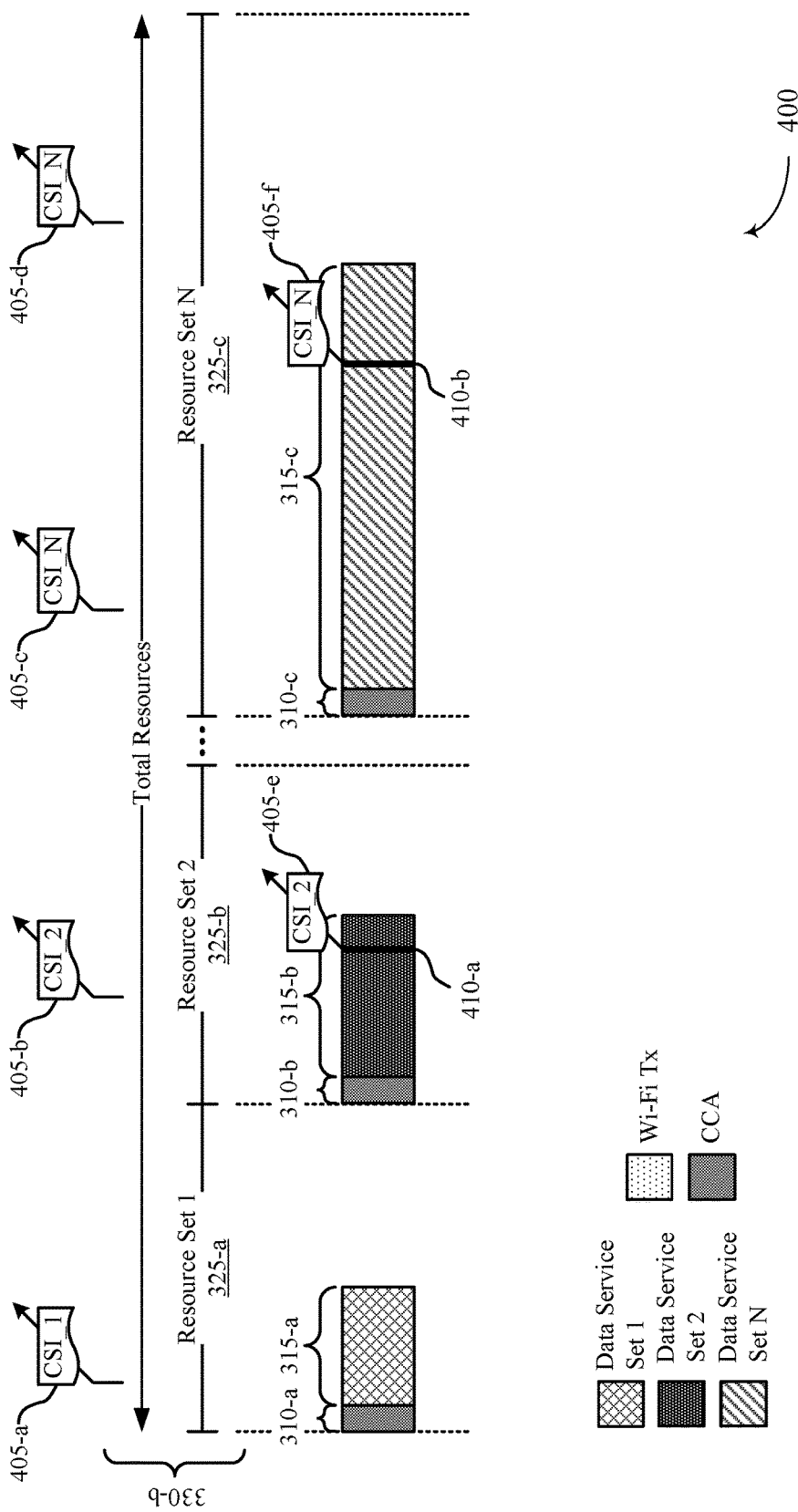
FIG. 4 illustrates an examples of CSI reporting scheme that supports quality of service related enhancements for LTE-U in accordance with various aspects of the present disclosure.

FIG. 4 illustrates an examples of CSI reporting scheme 400 that supports quality of service related enhancements for LTE-U in accordance with various aspects of the present disclosure. CSI reporting scheme 400 may illustrate aspects of a transmission between a UE 115 and a base station 105, as described above with reference to FIGS. 1-3B. A base station 105 may include CSI resources in data transmissions 315 to a UE 115, and a UE 115 may report CSI to the base station 105 either periodically or aperiodically based on the received CSI resource.

In one example, a UE reports a CSI report including CQI, PMI, and/or RI to a base station based on resource allocation pattern 330-*b*. The base station may use the CSI report to determine transmission parameters for subsequent transmissions such as power level, MCS, etc. In some cases, the UE may monitor and store separate CSI values for each resource set 325 (e.g., the reported value for CSI 405-*a* may be based on CSI resources received only during resource set 325-*a*, CSI 405-*b* may be based on CSI resources received during resource set 325-*b*, etc.). The device may also store measured CSI values per resource set 325 and may average or filter a number of CSI values for reporting to a base station. During periodic reporting, a UE may report at scheduled intervals. The UE may determine which CSI value (e.g., CSI_1, CSI_2, or CSI_N) to report based on which resource set 325 that a scheduled reporting interval corresponds. For instance, the device may transmit CSI 405-*a* (i.e., CSI_1) based on identifying that the schedule intervals occurs during resource set 325-*a* (i.e., resource set 1). Similarly, the device may transmit CSI 405-*b*, CSI 405-*c*, and CSI 405-*d* based on identified resource set 325-*b* and 325-*c* that corresponds with the reporting interval. CSI 405 may be reported over the PUCCH using control resources or over the physical uplink shared channel PUSCH if an uplink grant has been scheduled. For LAA transmissions, a UE may transmit CSI 405 using control resources on the primary CC. For LTE-U standalone transmissions the UE may transmit CSI 405 on PUSCH resources after performing a successful CCA that occurs during a reporting interval.

During aperiodic reporting, a UE may report CSI after receiving a CSI reporting trigger 410 from a base station. The UE may determine which CSI value (e.g., CSI_1, CSI_2, or CSI_N) to report based on identifying which resource set 325 includes the CSI reporting trigger 410. For instance, the UE may determine that CSI reporting trigger 410-*a* is received during resource set 325-*b* (i.e., resource set 2) and may subsequently report CSI 405-*e* (i.e., CSI_2). The device may similarly report CSI 405-*f* (i.e., CSI_N) based on receiving CSI reporting trigger 410-*b* during resource set 325-*c* (i.e., resource set N). For LTE-U standalone transmissions the UE may transmit CSI 405 on PUSCH resources after performing a successful CCA.

Figure 5:
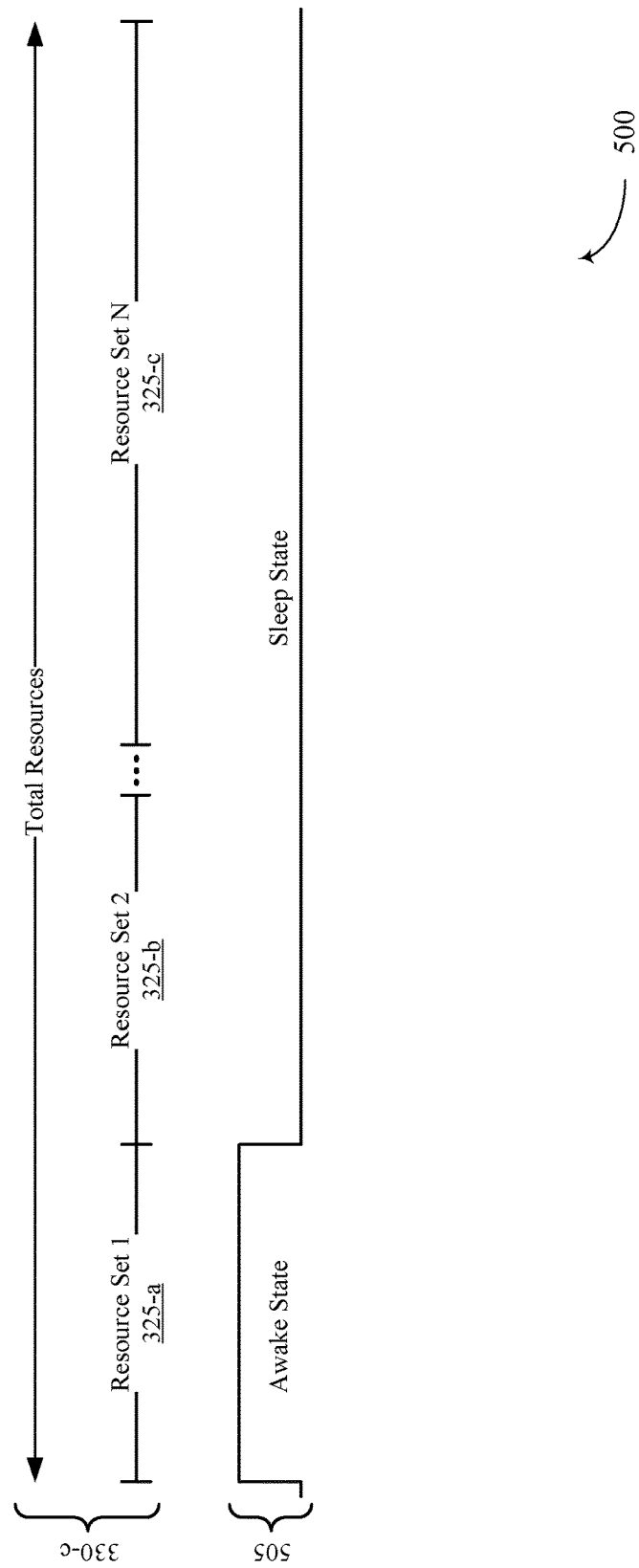
FIG. 5 illustrates an example of a DRX mode that supports quality of service related enhancements for LTE-U in accordance with various aspects of the present disclosure.

FIG. 5 illustrates an example timing diagram 500 of operation according to a DRX mode that supports quality of service related enhancements for LTE-U in accordance with various aspects of the present disclosure. Timing diagram 500 may illustrate aspects of communication and device states between a UE 115 and a base station 105, as described above with reference to FIGS. 1-3B. A DRX cycle 505 may be determined by a device, such as a UE 115, based on the resource allocation pattern 330-c.

In one example, a UE may analyze resource allocation pattern 330-c to identify the allocated resource sets 325 and the corresponding DSSs. In some cases, resource allocation pattern 330-c may be broadcast over the network by a base station and received at UE. In other cases, resource allocation pattern 330-c may be transmitted to the UE in an RRC message from a base station. Under either scenario, the UE may determine which resource sets 325 are associated with which DSSs and the time resources allocated to each resource set 325. The UE may also identify data types or services that are active and/or expected at the UE in addition to data types or services that are not active and/or not supported by the UE. In some cases, the UE identifies active data types based on bearers that are configured for the UE. Each bearer may be associated with a certain data type, QoS, and/or service type. The UE may then determine, for each identified data type or service, the DSS and resource set 325 that the identified service belongs to. The UE may then monitor the respective resource sets. The UE may similarly identify the DSSs associated with inactive and/or unsupported services and the corresponding resource sets 325. During these resource sets, the UE may enter a sleep state, during which the UE may refrain from monitoring the carrier, disable a receiver chain, decrease processing demands, etc.

For instance, resource set 325-a (i.e., resource set 1) may be associated with a first DSS that includes an eMBMS service, resource set 325-b (i.e., resource set 2) may be associated with a second DSS that includes QCI_1, and resource set 325-c (i.e., resource set N) may be associated with a third DSS that includes QCI_3. In some examples, QCI_1 may be associated with VoIP calling while QCI_3 may be associated with real-time interactive gaming. The UE may identify that eMBMS is supported at the UE (e.g., the UE has an active bearer associated with eMBMS), that VoIP calling is not currently active, and that online gaming is not active. The UE may then identify the resource sets 325 associated with each DSS and may monitor the first resource set 325-a based on identifying that eMBMS support is active, and may enter a sleep state for resource sets 325-b and 325-c based on determining that no data associated with the corresponding DSSs are currently active or supported.

Figure 6:
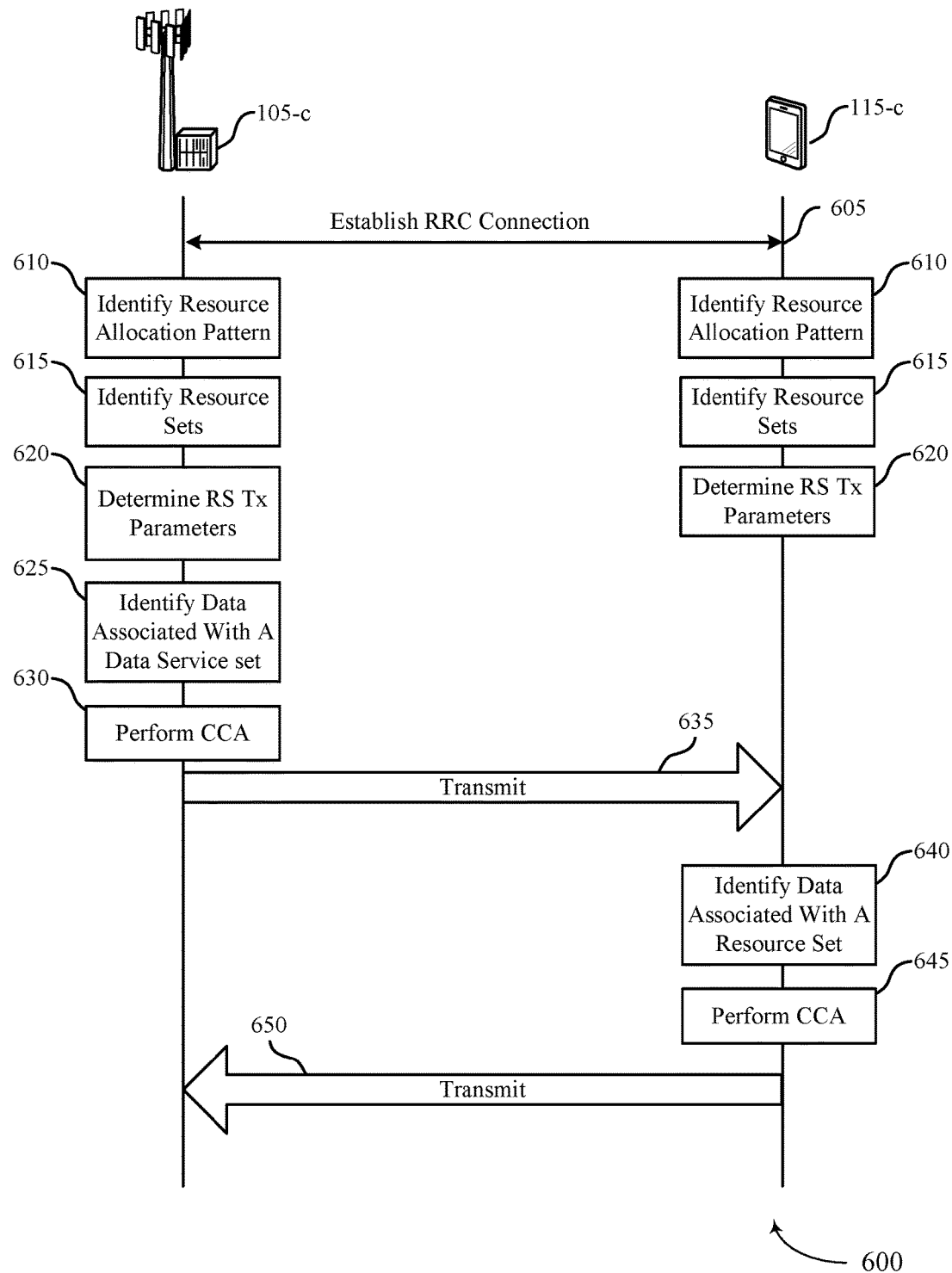
FIG. 6 illustrates an example of a process flow that supports quality of service related enhancements for LTE-U in accordance with various aspects of the present disclosure.

FIG. 6 illustrates an example of a process flow 600 for quality of service related enhancements for LTE-U in accordance with various aspects of the present disclosure. Process flow 600 may be performed by UE 115-c and base station 105-c, which may be an example of a UE 115 and base station 105 described above with reference to FIGS. 1-2. In some examples, base station 105-c and UE 115-c may communicate data over a carrier that operates in a shared channel according to a resource allocation pattern that groups the carrier's resources into resource sets that are associated with different data service sets.

At 605, base station 105-c establishes an RRC connection with UE 115-c. In some cases, such as in LAA mode, RRC messages are communicated via the PCC that uses the dedicated spectrum. Otherwise, in a standalone mode, the RRC messages are communicated over shared spectrum. Establishing the RRC connection may include enabling a device to operate using shared spectrum and sending a resource allocation pattern to UE 115-c.

At 610, the base station 105-c may identify a resource allocation pattern for a carrier using a shared channel. The resource allocation pattern may partition the carrier into periodic segments that are divided into a number of resource sets, which may be associated with different data service sets. The resource allocation pattern may be provided to multiple base stations 105 in a network and each base station may similarly perform any of the following process. UE 115-c may also identify the resource allocation pattern. In some cases, base station 105-c transmits the resource allocation pattern to UE 115-c via an RRC message. Additionally or alternatively, base station 105-c may broadcast the resource allocation pattern across the network to other base stations and UEs, such as UE 115-c, that are within transmission range. Broadcasting the resource allocation pattern may also include sending the resource allocation to other base stations via the X2 interface.

At 615, base station 105-c and UE 115-c may identify the resource sets that are allocated by the resource allocation pattern. Identifying the resource sets may include identifying the carrier resources within a periodic segment that are allocated to each resource set. For instance, base station 105-c and UE 115-c may identify that the first 20 subframes of each set of 80 subframes are allocated to the first resource set. Base station 105-c and UE 115-c may further identify that the first 20 subframes are associated with a DSS that includes data for a service, such as eMBMS.

At 620, base station 105-c and UE 115-c may determine resource set (RS) transmission parameters for the identified resource sets based on the associated DSS. For instance, a resource set may be associated with a DSS that includes QoS levels QCI_1 and QCI_2. Accordingly, LBT parameters, such as the contention window, the deferral duration, contention window adaptation scheme, or the energy detection threshold may be set to certain values for communications during the resource set. Base station 105-c and UE 115-c may similarly determine LBT parameters for each resource set based on the associated DSS. In some cases, the LBT parameters for the contention window adaptation scheme may include a window step factor or triggers for applying a window step (e.g., number of unsuccessful CCAs, etc.). The RS transmission parameters may include a type of HARQ process for data transmissions for the associated resource set.

At 625, base station 105-c may identify and group data in transmission queue(s) associated with the respective DSSs. Base station 105-c may then determine which data to transmit during which resource sets based on the resource sets identified above. For instance, base station 105-c may identify any eMBMS data to be transmitted in a first resource set.

At 630, prior to transmitting over the first resource set, base station 105-c may perform a CCA to determine if the channel is clear. The CCA may be performed based on the LBT parameters that are associated with the DSS that corresponds to the first resource set. Since the resource allocation pattern is provided across multiple base stations and because the carrier's time resources are aligned across the base stations, other base station may synchronously perform a CCA, using the same LBT parameters, with base station 105-c.

At 635, after performing a successful CCA, base station 105-c may transmit data associated with a resource set over the carrier to UE 115-c. Another base station that is configured for communication over the carrier using the resource allocation pattern may also perform a successful CCA and simultaneously transmit over the carrier. The base stations may be located so that the transmissions from neighbor base stations do not interfere with transmissions from base station 105-*c* or so that UE 115-*c* can apply interference cancellation for transmissions from other base stations. In some cases, the base stations may transmit the same data as base station 105-*c* and boost the signal to noise ratio for the transmission at UE 115-*c*. During the transmission UE 115-*c* may use the identified resource allocation pattern to determine periods to monitor the carrier or to enter a sleep state based on DSSs that are active or supported at UE 115-*c*. Communication of the data may be performed according to the type of HARQ process selected at 620 for the DSS associated with the respective resource set.

At 640, UE 115-*c* may identify and group data in transmission queue(s) associated with respective DSSs. UE 115-*c* may then determine which data to transmit during which resource sets based on the resource sets identified at 610.

At 645, UE 115-*c* may perform a CCA to determine if the channel is clear. The CCA may be performed based on the LBT parameters that are associated with the DSS that corresponds to the current resource set. For example, the UE 115-*c* may identify a resource set associated with UE-initiated uplink transmissions (e.g., UE transmissions not performed in response to a specific resource grant by a base station). In other examples, the UE 115-*c* may identify a grant of resources within a resource set associated with a DSS, and use LBT parameters that are associated with the DSS.

At 650, after performing a successful CCA, UE 115-*c* may transmit data supported by a resource set over the carrier to base station 105-*c*. In some cases, UE 115-*c* uses the same carrier that was used in the downlink while in other cases UE 115-*c* uses a different carrier. Communication of the data may be performed according to the type of HARQ process selected at 620 for the DSS associated with the respective resource set.

Figure 7:
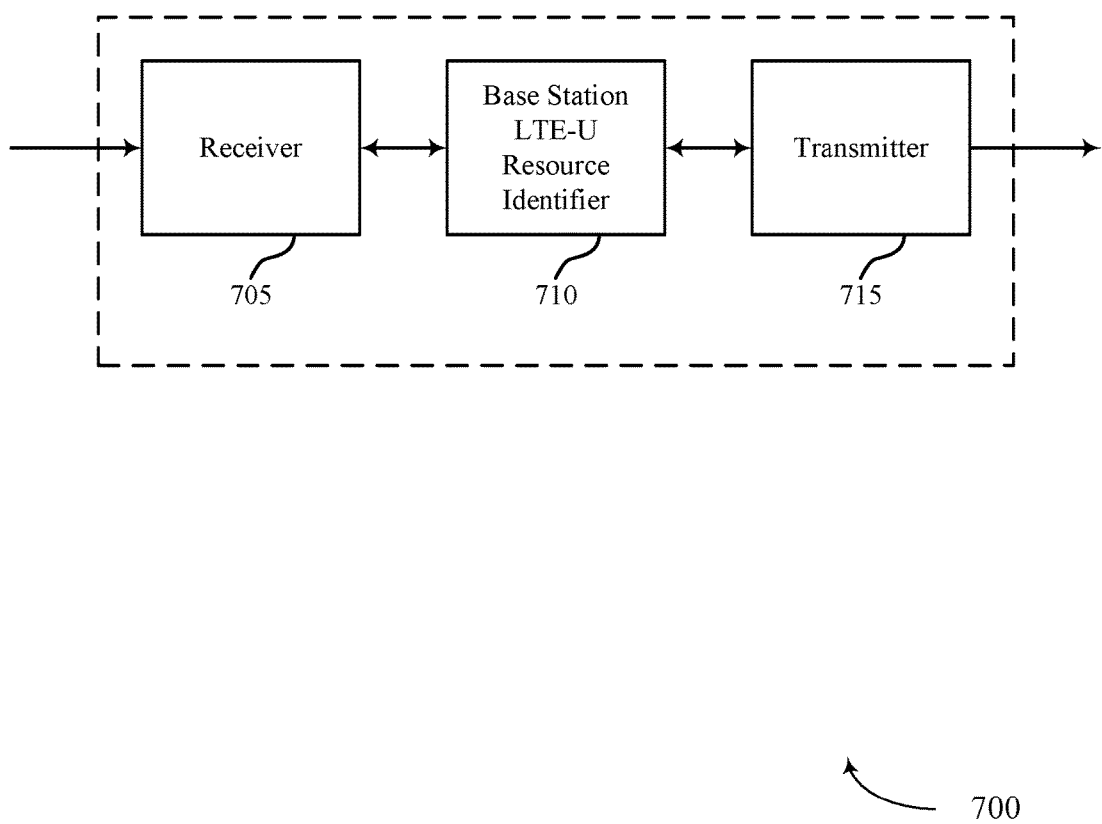
FIGS. 7-8 show block diagrams of a wireless device that supports quality of service related enhancements for LTE-U in accordance with various aspects of the present disclosure.

FIG. 7 shows a block diagram of a wireless device 700 configured for quality of service related enhancements for LTE-U in accordance with various aspects of the present disclosure. Wireless device 700 may be an example of aspects of a base station 105 described with reference to FIGS. 1-6. Wireless device 700 may include a receiver 705, base station LTE-U resource identifier 710, or a transmitter 715. Wireless device 700 may also include a processor. Each of these components may be in communication with each other.

The receiver 705 may receive information such as packets, user data, or control information associated with various information channels (e.g., control channels, data channels, and information related to quality of service related enhancements for LTE-U, etc.). Information may be passed on to the base station LTE-U resource identifier 710, and to other components of wireless device 700.

The base station LTE-U resource identifier 710 may identify a resource allocation pattern for a plurality of base stations, where the resource allocation pattern groups communication time resources of a carrier in a shared spectrum into a plurality of resource sets associated with different data service sets, identify a first resource set associated with a first data service set of the different data service sets, and communicate, with at least one user equipment, first data traffic associated with the first data service set over the first resource set. The base station LTE-U resource identifier 710 may identify multiple resource allocation patterns for multiple carriers, and resource sets for multiple data service sets may be coordinated across carriers (e.g., a data service set may be allocated a different amount of resources on each of multiple carriers, or different data service sets may be allocated resources on different carriers, etc.)

The transmitter 715 may transmit signals received from other components of wireless device 700. In some examples, the transmitter 715 may be collocated with the receiver 705 in a transceiver module. The transmitter 715 may be configured to operate using a single antenna, or it may be configured to operate using multiple antennas. In some examples, the transmitter 715 may transmit first data traffic over the carrier using resources of the first resource set based at least in part on determining that a successful CCA has been performed. In some examples, the transmitter 715 may be used to broadcast the resource allocation pattern to other base stations of a radio access network. In some examples, the transmitter 715 may transmit, to the at least one user equipment, the resource allocation pattern.

Figure 8:
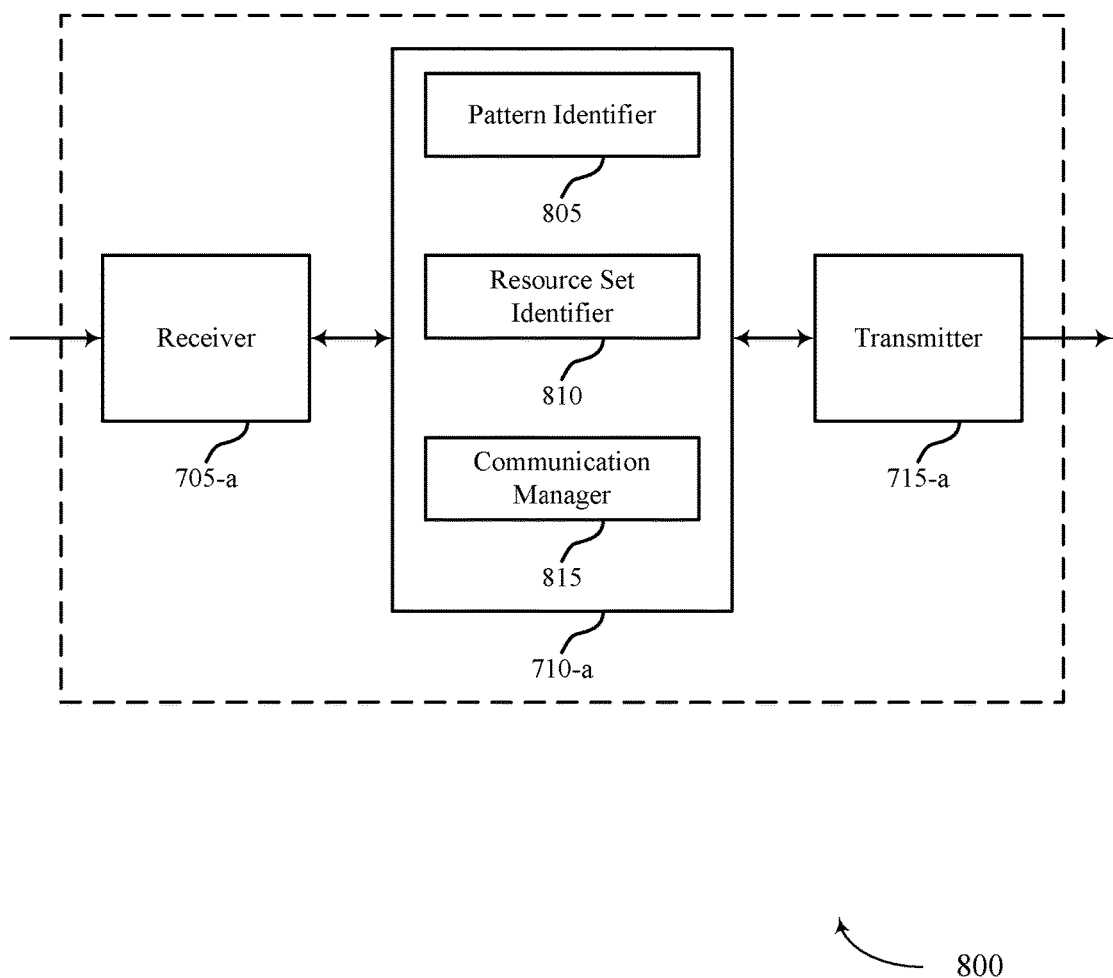

FIG. 8 shows a block diagram of a wireless device 800 for quality of service related enhancements for LTE-U in accordance with various aspects of the present disclosure. Wireless device 800 may be an example of aspects of a wireless device 700 or a base station 105 described with reference to FIGS. 1-7. Wireless device 800 may include a receiver 705-*a*, a base station LTE-U resource identifier 710-*a*, or a transmitter 715-*a*. Wireless device 800 may also include a processor. Each of these components may be in communication with each other. The base station LTE-U resource identifier 710-*a* may also include a pattern identifier 805, a resource set identifier 810, and a communication manager 815.

The receiver 705-*a* may receive information which may be passed on to base station LTE-U resource identifier 710-*a*, and to other components of wireless device 800. The base station LTE-U resource identifier 710-*a* may perform the operations described with reference to FIG. 7. The transmitter 715-*a* may transmit signals received from other components of wireless device 800.

The pattern identifier 805 may identify a resource allocation pattern for a plurality of base stations, wherein the resource allocation pattern groups communication time resources of a carrier in a shared spectrum into a plurality of resource sets associated with different data service sets as described with reference to FIGS. 2-6. In some examples, the identifying the resource allocation pattern comprises receiving the resource allocation pattern from a network device associated with the plurality of base stations. In some examples, the communication time resources are any of a frame, a subframe, or a symbol period. In some examples, the communication time resources are synchronized for the plurality of base stations.

The resource set identifier 810 may identify a first resource set associated with a first data service set of the different data service sets as described with reference to FIGS. 2-6. In some examples, each resource set comprises a plurality of contiguous communication time resources. In some examples, each of the different data service sets may be associated with any of one or more QoS identifiers, one or more service type identifiers (e.g., eMBMS, MTC service, UE-initiated uplink transmissions, etc.), or a combination thereof.

The communication manager 815 may communicate, with at least one user equipment, first data traffic associated with the first data service set over the first resource set as described with reference to FIGS. 2-6. In some examples, the communicating comprises determining an LBT parameter based at least in part on the first data service and performing a CCA over the carrier based at least in part on the LBT parameter. In some examples, the LBT parameter comprises any of a contention window size, a deferral period, a contention window adaptation scheme, an energy detection threshold, or any combination thereof. Communication of the first data traffic may be performed according to a type of HARQ associated with the first data service set.

Figure 9:
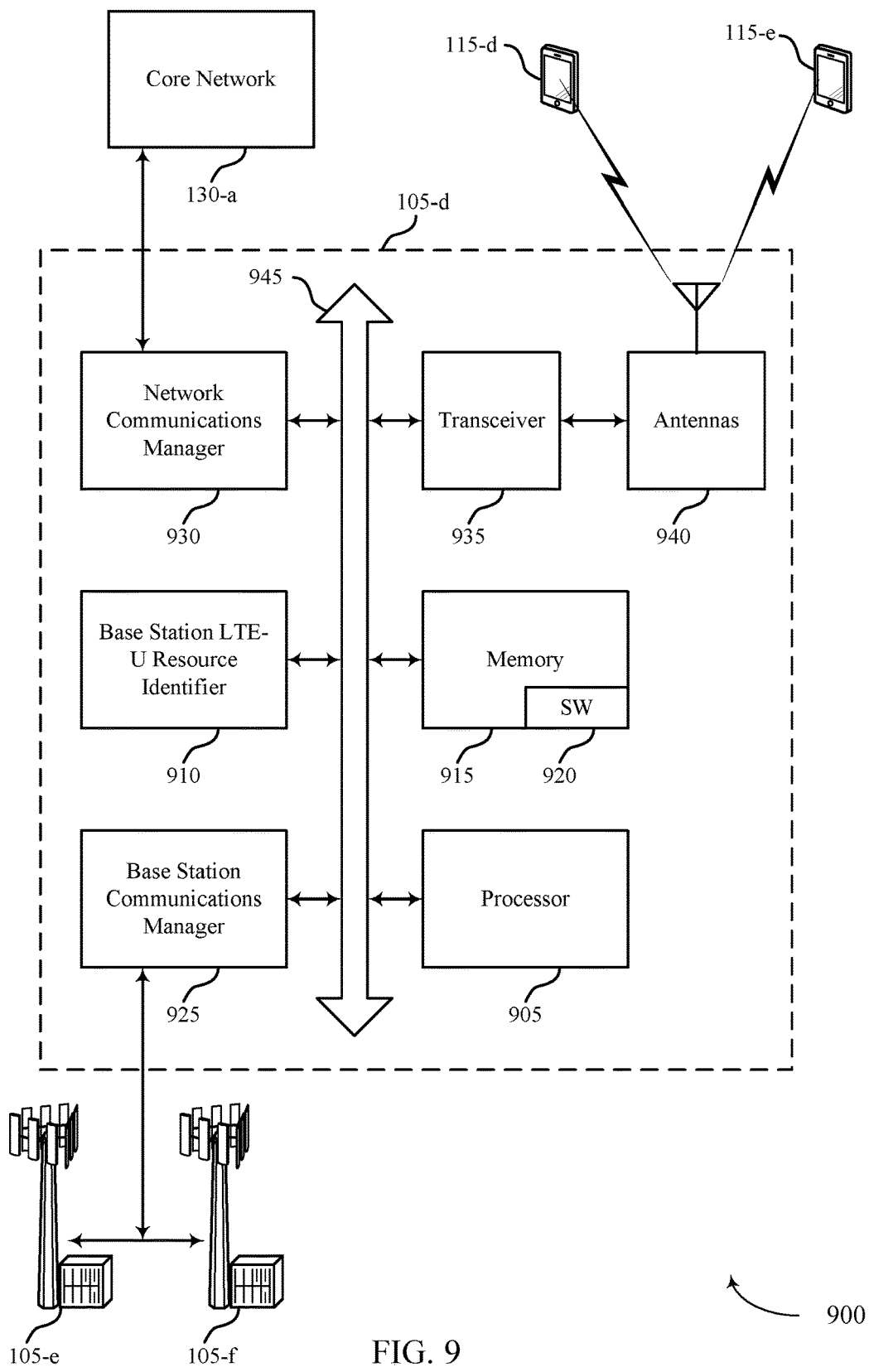
FIG. 9 illustrates a block diagram of a system including a base station that supports quality of service related enhancements for LTE-U in accordance with various aspects of the present disclosure.

FIG. 9 shows a diagram of a system 900 including abase station 105-d configured for quality of service related enhancements for LTE-U in accordance with various aspects of the present disclosure. System 900 may include base station 105-d, which may be an example of a wireless device 700, a wireless device 800, or a base station 105 described with reference to FIGS. 1, 2 and 6-9. Base station 105-d may include a base station LTE-U resource identifier 910, which may be an example of a base station LTE-U resource identifier 710 described with reference to FIGS. 7-9. Base station 105-d may also include components for bi-directional voice and data communications including components for transmitting communications and components for receiving communications. For example, base station 105-d may communicate bi-directionally with UE 115-d or UE 115-e.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications manager 925. In some examples, base station communications manager 925 may provide an X2 interface within an LTE/LTE-A wireless communication network technology to provide communication between some of the base stations 105. In some examples, base station 105-d may communicate with other base stations through core network 130. In some cases, base station 105-d may communicate with the core network 130 through network communications manager 930.

The base station 105-d may include a processor 905, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-d) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-d may include multiple transceivers 935, each with one or more associated antennas 940. The transceiver may be an example of a combined receiver 705 and transmitter 715 of FIG. 7.

The memory 915 may include RAM and ROM. The memory 915 may also store computer-readable, computer-executable software code 920 containing instructions that are configured to, when executed, cause the processor 905 to perform various functions described herein (e.g., quality of service related enhancements for LTE-U, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications manager 925 may manage communications with other base stations 105. In some cases, the base station communications manager 925 may include a controller or scheduler for controlling communications with UEs 115 in cooperation with other base stations 105. For example, the base station communications manager 925 may coordinate scheduling for transmissions to UEs 115 for various interference mitigation techniques such as beamforming or joint transmission.

The components of wireless device 700, wireless device 800, and base station LTE-U resource identifier 710-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
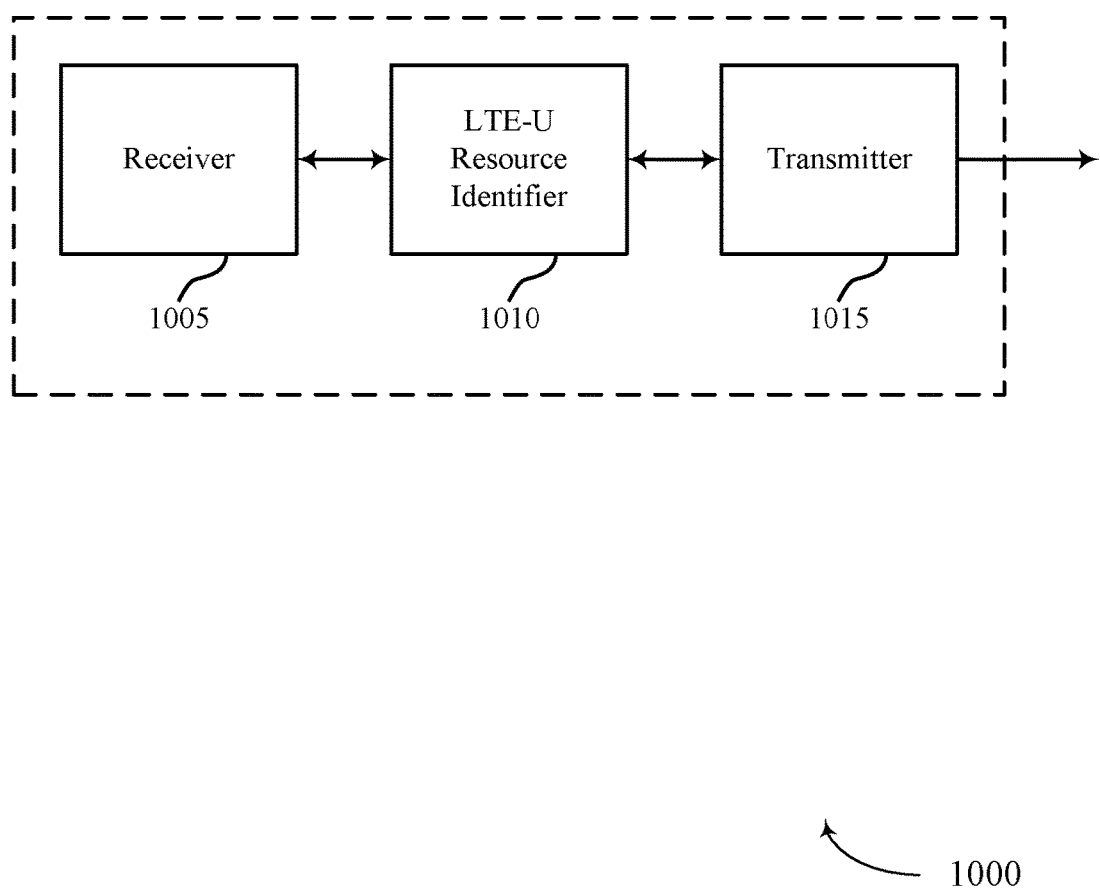
FIGS. 10-12 show block diagrams of a wireless device that supports quality of service related enhancements for LTE-U in accordance with various aspects of the present disclosure.

FIG. 10 shows a block diagram of a wireless device 1000 configured for quality of service related enhancements for LTE-U in accordance with various aspects of the present disclosure. Wireless device 1000 may be an example of aspects of a UE 115 described with reference to FIGS. 1-10. Wireless device 1000 may include a receiver 1005, a LTE-U resource identifier 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to quality of service related enhancements for LTE-U, etc.). Information may be passed on to the LTE-U resource identifier 1010, and to other components of wireless device 1000.

The LTE-U resource identifier 1010 may identify a resource allocation pattern for a carrier in a shared spectrum, wherein the resource allocation pattern groups communication time resources of the carrier into a plurality of resource sets associated with different data services, identify a first resource set associated with a first data service of the different data services, and communicate, with a base station associated with the carrier, first data traffic that is associated with the first data service over the first resource set.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas.

Figure 11:
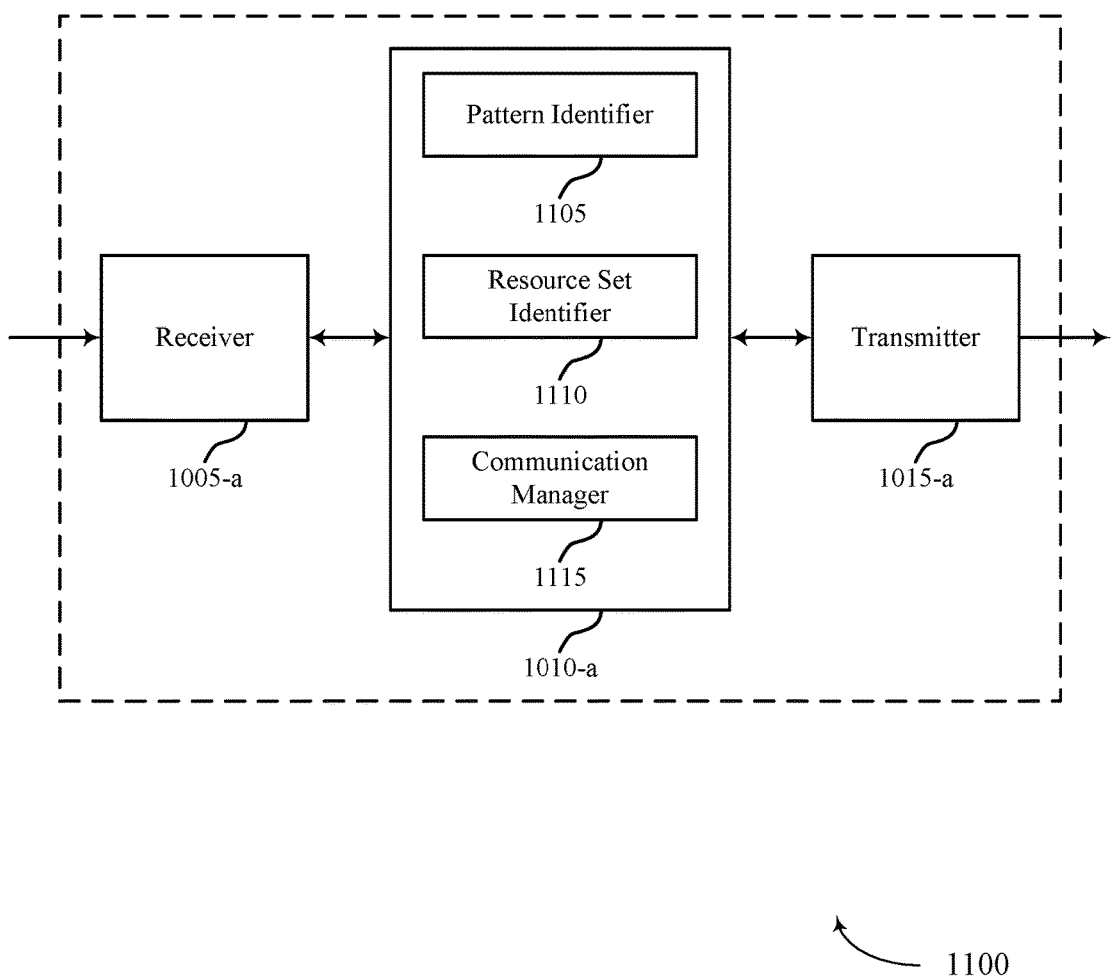

FIG. 11 shows a block diagram of a wireless device 1100 for quality of service related enhancements for LTE-U in accordance with various aspects of the present disclosure. Wireless device 1100 may be an example of aspects of a wireless device 1000 or a UE 115 described with reference to FIGS. 1-11. Wireless device 1100 may include a receiver 1005-*a*, a LTE-U resource identifier 1010-*a*, or a transmitter 1015-*a*. Wireless device 1100 may also include a processor. Each of these components may be in communication with each other. The LTE-U resource identifier 1010-*a* may also include a pattern identifier 1105, a resource set identifier 1110, and a communication manager 1115.

The receiver 1005-*a* may receive information which may be passed on to LTE-U resource identifier 1010-*a*, and to other components of wireless device 1100. The LTE-U resource identifier 1010-*a* may perform the operations described with reference to FIG. 10. The transmitter 1015-*a* may transmit signals received from other components of wireless device 1100.

The pattern identifier 1105 may identify a resource allocation pattern for a carrier in a shared spectrum, wherein the resource allocation pattern groups communication time resources of the carrier into a plurality of resource sets associated with different data services.

The resource set identifier 1110 may identify a first resource set associated with a first data service of the different data services. In some examples, the identifying the first data service comprises any of identifying an active bearer associated with the first data service, identifying an active service associated with the first data service, or a combination thereof.

The communication manager 1115 may communicate, with a base station associated with the carrier, first data traffic that is associated with the first data service over the first resource set. Communication of the first data traffic may be performed according to a type of HARQ associated with the first data service set.

Figure 12:
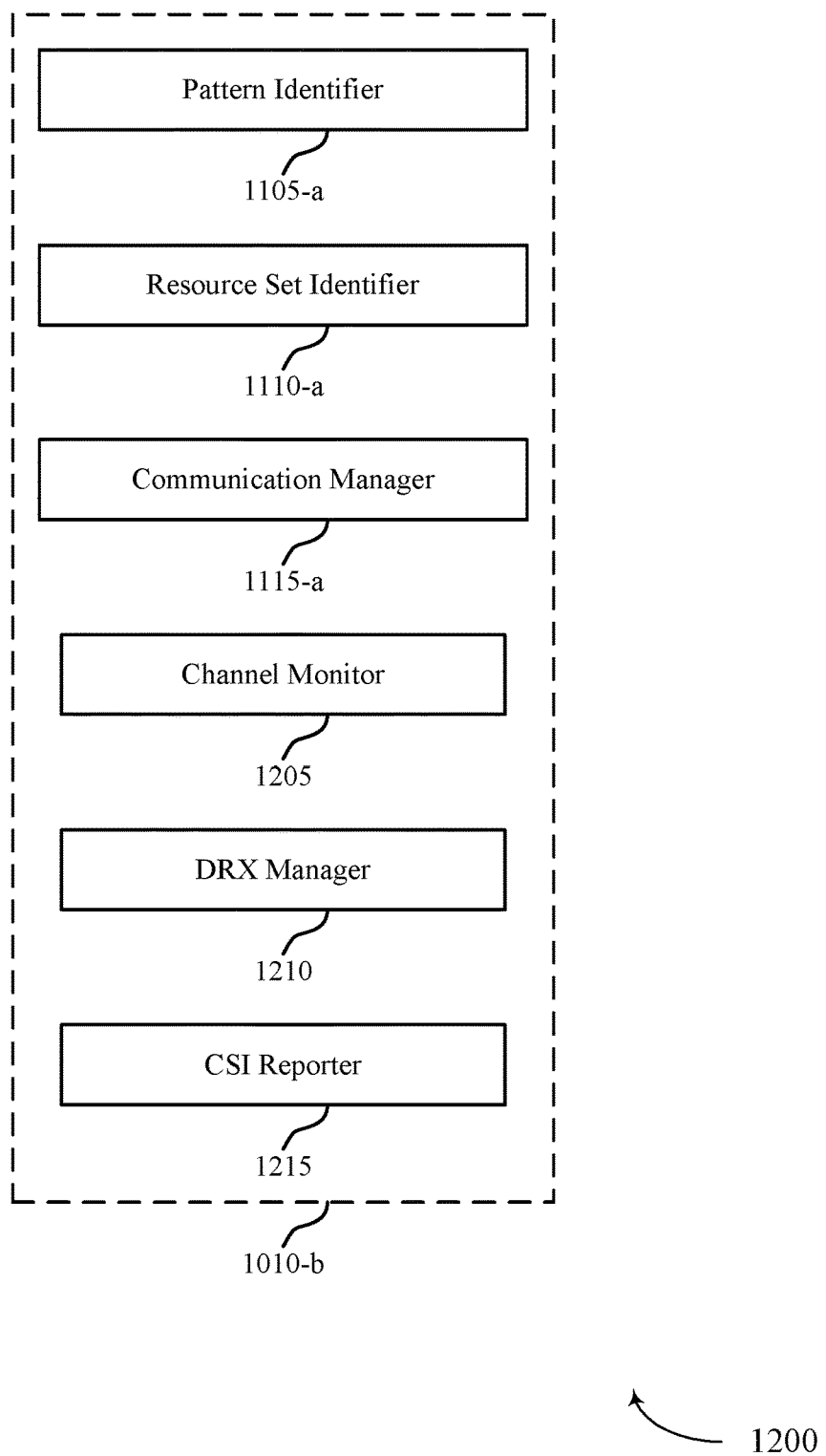

FIG. 12 shows a block diagram 1200 of a LTE-U resource identifier 1010-*b* which may be a component of a wireless device 1000 or a wireless device 1100 for quality of service related enhancements for LTE-U in accordance with various aspects of the present disclosure. The LTE-U resource identifier 1010-*b* may be an example of aspects of a LTE-U resource identifier 1010 described with reference to FIGS. 10-11. The LTE-U resource identifier 1010-*b* may include a pattern identifier 1105-*a*, a resource set identifier 1110-*a*, and a communication manager 1115-*a*. Each of these modules may perform the functions described with reference to FIG. 11. The LTE-U resource identifier 1010-*b* may also include a channel monitor 1205, a DRX manager 1210, and a CSI reporter 1215.

The channel monitor 1205 may be configured such that the communicating may include monitoring a channel associated with the carrier during the first resource set for the first data traffic as described with reference to FIGS. 2-6.

The DRX manager 1210 may manage DRX operation according to a resource allocation pattern, including entering a sleep state during one or more resource sets of the plurality of resource sets as described with reference to FIGS. 2-6. In some examples, the entering the sleep state comprises disabling a receiver during the one or more resource sets of the plurality of resource sets.

The CSI reporter 1215 may report CSI (e.g., CQI, PMI, RI, etc.) for respective resource sets of the plurality of resource sets, wherein the reported CSI is based at least in part on CSI resources associated with the respective resource sets as described with reference to FIGS. 2-6.

Figure 13:
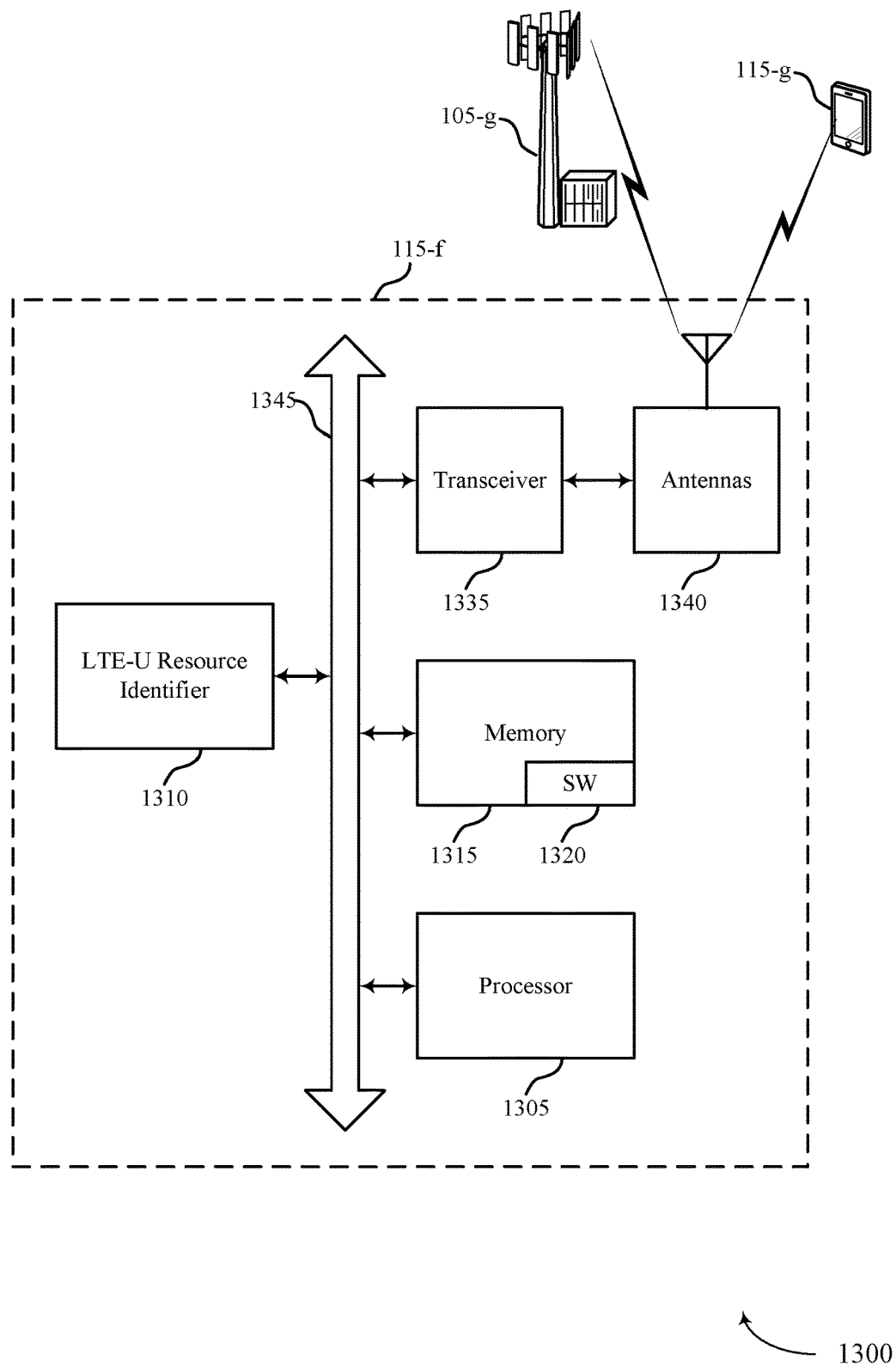
FIG. 13 illustrates a block diagram of a system including a user equipment (UE) that supports quality of service related enhancements for LTE-U in accordance with various aspects of the present disclosure.

FIG. 13 shows a diagram of a system 1300 including a UE 115-*f* configured for quality of service related enhancements for LTE-U in accordance with various aspects of the present disclosure. System 1300 may include UE 115-*f*, which may be an example of a wireless device 1000, a wireless device 1100, or a UE 115 described with reference to FIGS. 1, 2, 6, 10 and 11. UE 115-*f* may include a LTE-U resource identifier 1310, which may be an example of a LTE-U resource identifier 1010 described with reference to FIGS. 10-12. UE 115-*f* may also include components for bi-directional voice and data communications including components for transmitting communications and components for receiving communications. For example, UE 115-*f* may communicate bi-directionally with UE 115-*g* or base station 105-*g*.

UE 115-*f* may also include a processor 1305, and memory 1315 (including software (SW)) 1320, a transceiver 1335, and one or more antenna(s) 1340, each of which may communicate, directly or indirectly, with one another (e.g., via buses 1345). The transceiver 1335 may communicate bi-directionally, via the antenna(s) 1340 or wired or wireless links, with one or more networks, as described above. For example, the transceiver 1335 may communicate bi-directionally with a base station 105 or another UE 115. The transceiver 1335 may include a modem to modulate the packets and provide the modulated packets to the antenna(s) 1340 for transmission, and to demodulate packets received from the antenna(s) 1340. While UE 115-*f* may include a single antenna 1340, UE 115-*f* may also have multiple antennas 1340 capable of concurrently transmitting or receiving multiple wireless transmissions.

The memory 1315 may include random access memory (RAM) and read only memory (ROM). The memory 1315 may store computer-readable, computer-executable software/firmware code 1320 including instructions that, when executed, cause the processor 1305 to perform various functions described herein (e.g., quality of service related enhancements for LTE-U, etc.). Alternatively, the software/firmware code 1320 may not be directly executable by the processor 1305 but cause a computer (e.g., when compiled and executed) to perform functions described herein. The processor 1305 may include an intelligent hardware device, (e.g., a central processing unit (CPU), a microcontroller, an application specific integrated circuit (ASIC), etc.)

The components of wireless devices 1000 or 1100 including the LTE-U resource identifier 1010 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
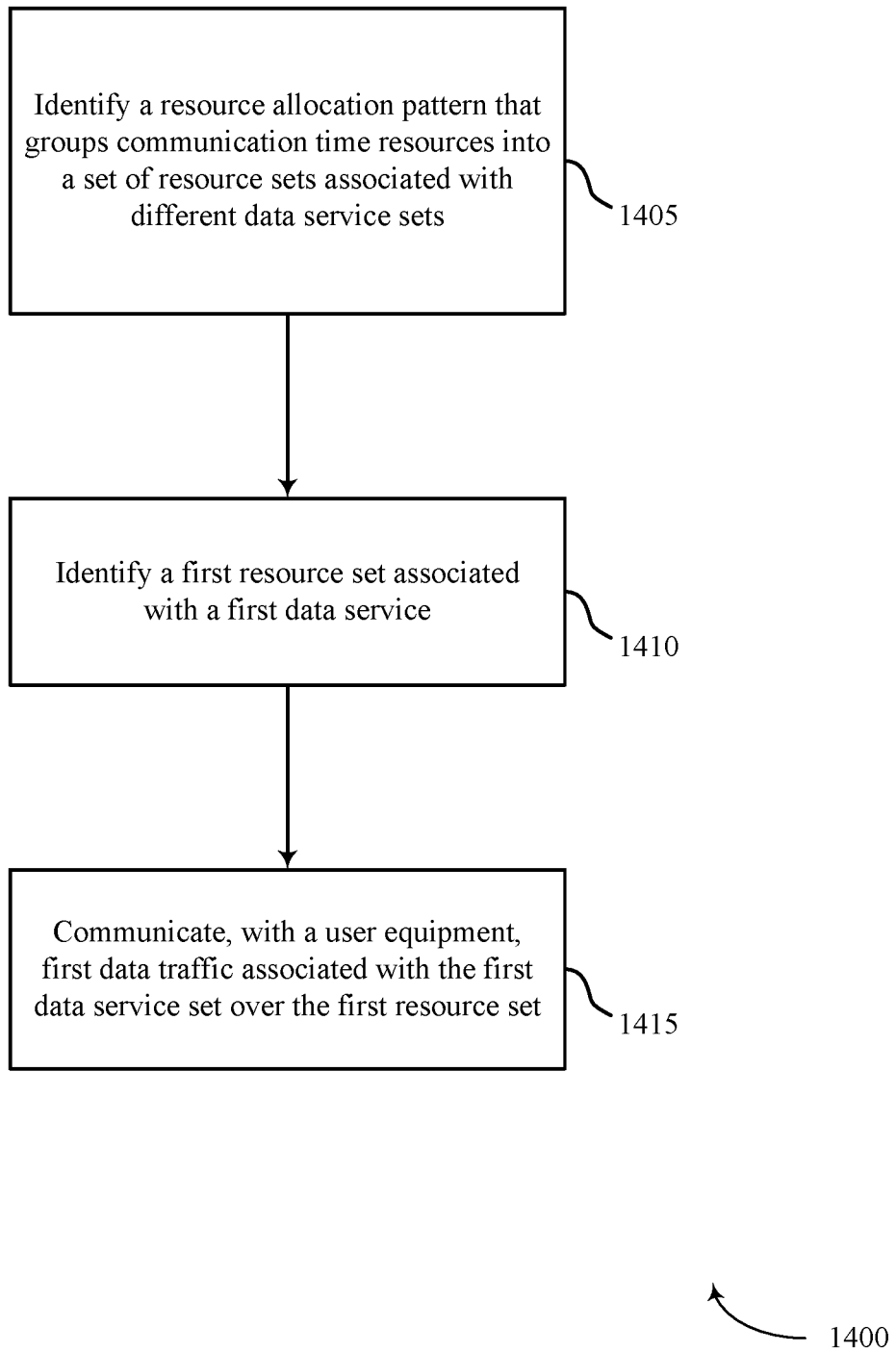
FIGS. 14-18 illustrate methods for quality of service related enhancements for LTE-U in accordance with various aspects of the present disclosure.

FIG. 14 shows a flowchart illustrating a method 1400 for quality of service related enhancements for LTE-U in accordance with various aspects of the present disclosure. The operations of method 1400 may be implemented by a base station 105 or its components as described with reference to FIGS. 1-10. For example, the operations of method 1400 may be performed by the base station LTE-U resource identifier 710 as described with reference to FIGS. 7-10. In some examples, a processor may execute a set of codes to control the functional elements of the base station 105 to perform the functions described below. Additionally or alternatively, the base station 105 may perform aspects the functions described below using special-purpose hardware.

At block 1405, the base station 105 may identify a resource allocation pattern for a plurality of base stations, wherein the resource allocation pattern groups communication time resources of a carrier in a shared spectrum into a plurality of resource sets associated with different data service sets as described with reference to FIGS. 2-6. In certain examples, the operations of block 1405 may be performed by the pattern identifier 805 as described with reference to FIG. 8.

At block 1410, the base station 105 may identify a first resource set associated with a first data service set of the different data service sets as described with reference to FIGS. 2-6. In certain examples, the operations of block 1410 may be performed by the resource set identifier 810 as described with reference to FIG. 8.

At block 1415, the base station 105 may communicate, with at least one user equipment, first data traffic associated with the first data service set over the first resource set as described with reference to FIGS. 2-6. In certain examples, the operations of block 1415 may be performed by the communication manager 815 as described with reference to FIG. 8.

Figure 15:
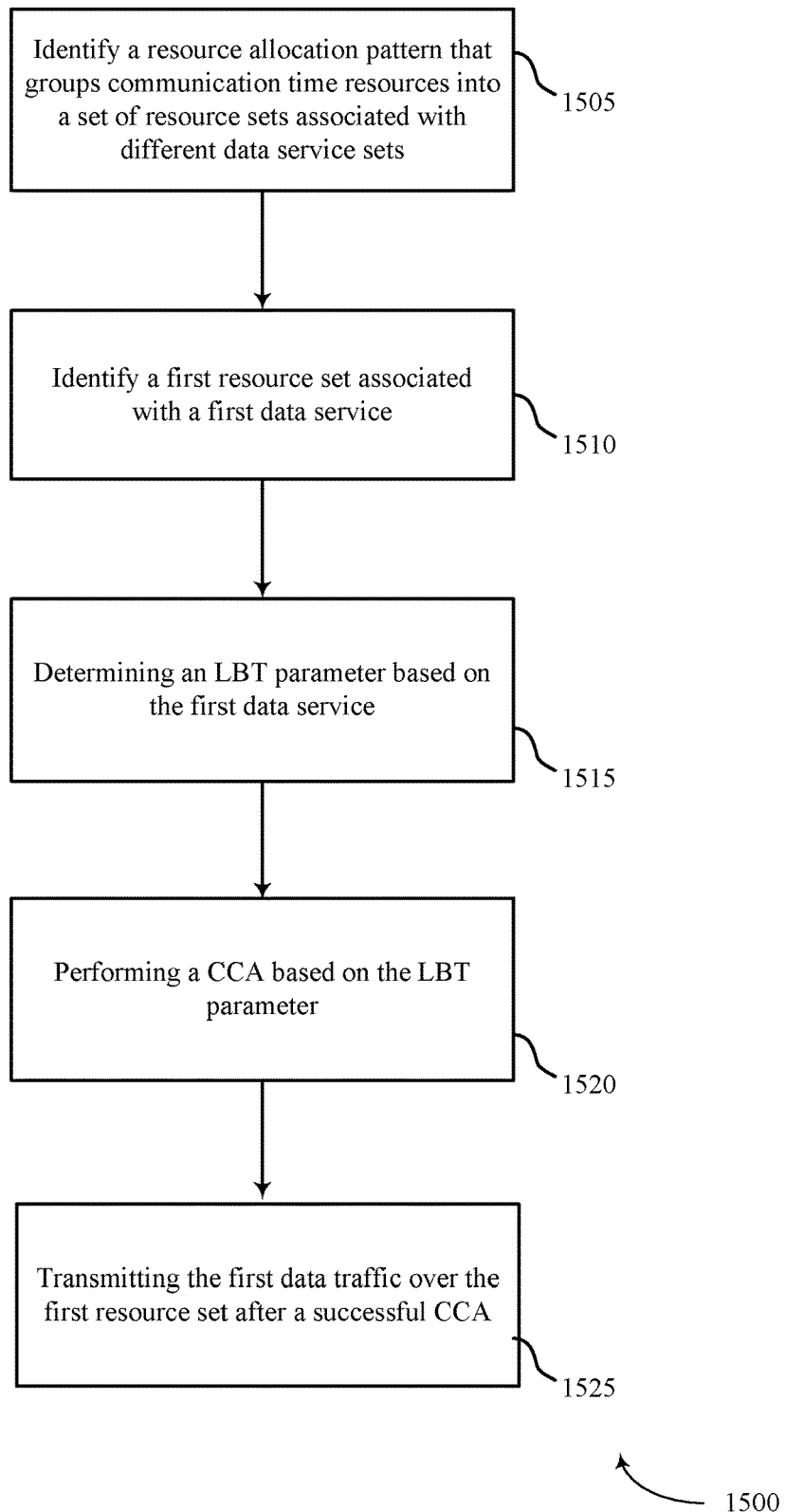

FIG. 15 shows a flowchart illustrating a method 1500 for quality of service related enhancements for LTE-U in accordance with various aspects of the present disclosure. The operations of method 1500 may be implemented by a base station 105 or its components as described with reference to FIGS. 1-10. For example, the operations of method 1500 may be performed by the base station LTE-U resource identifier 710 as described with reference to FIGS. 7-10. In some examples, a processor may execute a set of codes to control the functional elements of the base station 105 to perform the functions described below. Additionally or alternatively, the base station 105 may perform aspects the functions described below using special-purpose hardware. The method 1500 may also incorporate aspects of method 1400 of FIG. 14.

At block 1505, the base station 105 may identify a resource allocation pattern for a plurality of base stations, where communication time resources associated with a carrier in a shared spectrum are grouped by the resource allocation pattern into a plurality of resource sets associated with different data service sets as described with reference to FIGS. 2-6. In certain examples, the operations of block 1505 may be performed by the pattern identifier 805 as described with reference to FIG. 8.

At block 1510, the base station 105 may identify a first resource set associated with a first data service set of the different data service sets as described with reference to FIGS. 2-6. In certain examples, the operations of block 1510 may be performed by the resource set identifier 810 as described with reference to FIG. 8.

At block 1515, the base station 105 may determine LBT parameters based at least in part on the first data service, as described with reference to FIGS. 2-6. In certain examples, the operations of block 1515 may be performed by the communication manager 815 as described with reference to FIG. 8.

At block 1520, the base station 105 may perform a CCA over the carrier based at least in part on the LBT parameters as described with reference to FIGS. 2-6. In certain examples, the operations of block 1520 may be performed by the communication manager 815 as described with reference to FIG. 8.

At block 1525, the base station 105 may transmit the first data traffic over the first resource set based at least in part on determining that a successful CCA has been performed as described with reference to FIGS. 2-6. In certain examples, the operations of block 1525 may be performed by the transmitter 715 as described with reference to FIG. 7.

Figure 16:
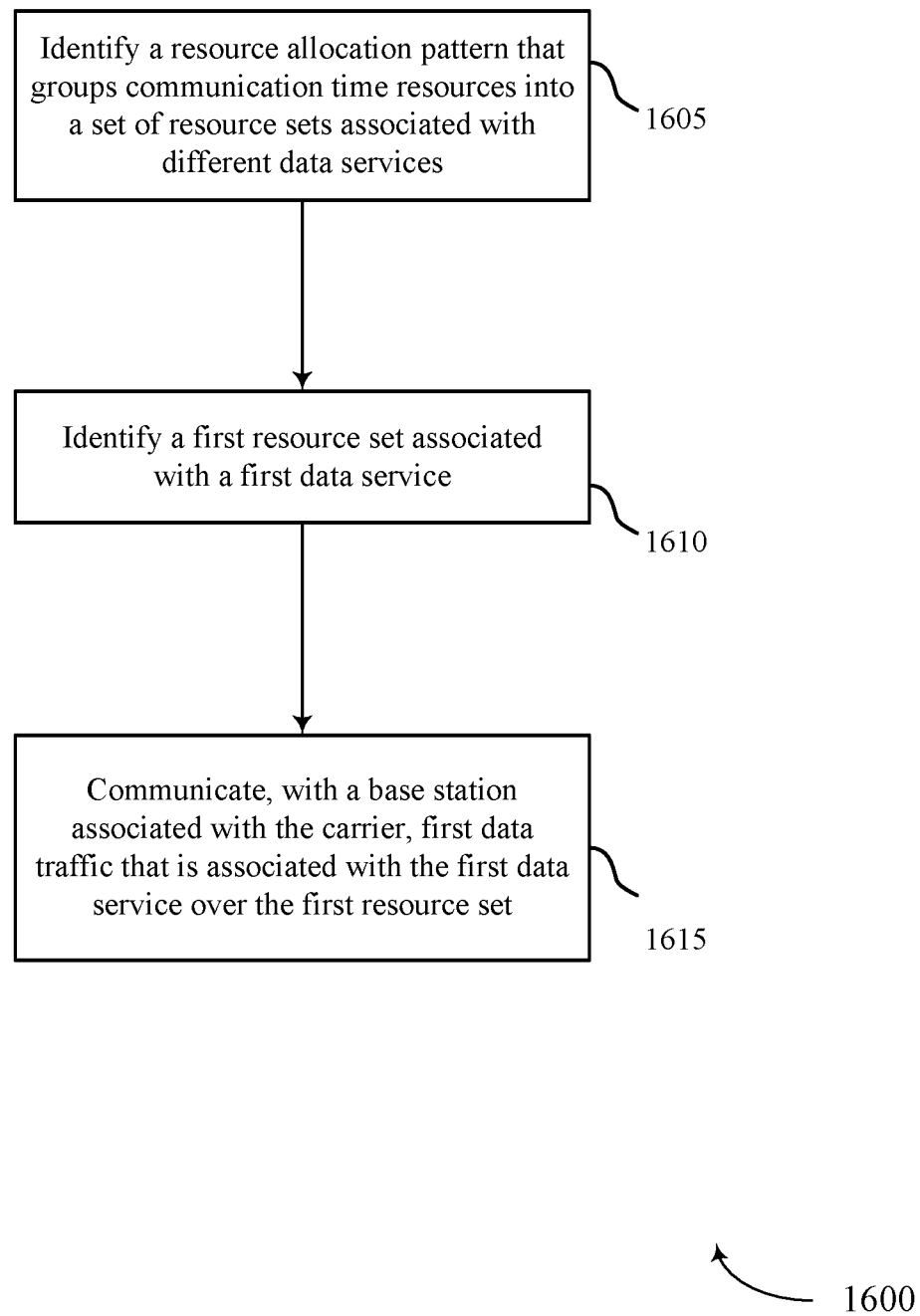

FIG. 16 shows a flowchart illustrating a method 1600 for quality of service related enhancements for LTE-U in accordance with various aspects of the present disclosure. The operations of method 1600 may be implemented by a UE 115 or its components as described with reference to FIGS. 1-6 and 11-14. For example, the operations of method 1600 may be performed by the LTE-U resource identifier 1010 as described with reference to FIGS. 11-14. In some examples, a processor may execute a set of codes to control the functional elements of the UE 115 to perform the functions described below. Additionally or alternatively, the UE 115 may perform aspects the functions described below using special-purpose hardware.

At block 1605, the UE 115 may identify a resource allocation pattern for a carrier in a shared spectrum, where the communication time resources associated with the carrier are grouped by the resource allocation pattern into a plurality of resource sets associated with different data services as described with reference to FIGS. 2-6. In certain examples, the operations of block 1605 may be performed by the pattern identifier 1105 as described with reference to FIG. 11.

At block 1610, the UE 115 may identify a first resource set associated with a first data service of the different data services as described with reference to FIGS. 2-6. In certain examples, the operations of block 1610 may be performed by the resource set identifier 1110 as described with reference to FIG. 11.

At block 1615, the UE 115 may communicate, with a base station associated with the carrier, first data traffic that is associated with the first data service over the first resource set as described with reference to FIGS. 2-6. The communicating may include receiving the first data traffic or transmitting the first data traffic. In some examples, the first resource set may be associated with UE-initiated transmissions. In other examples, the UE may transmit in accordance with a grant of resources of the resource set. In certain examples, the operations of block 1615 may be performed by the communication manager 1115 as described with reference to FIG. 11.

Figure 17:
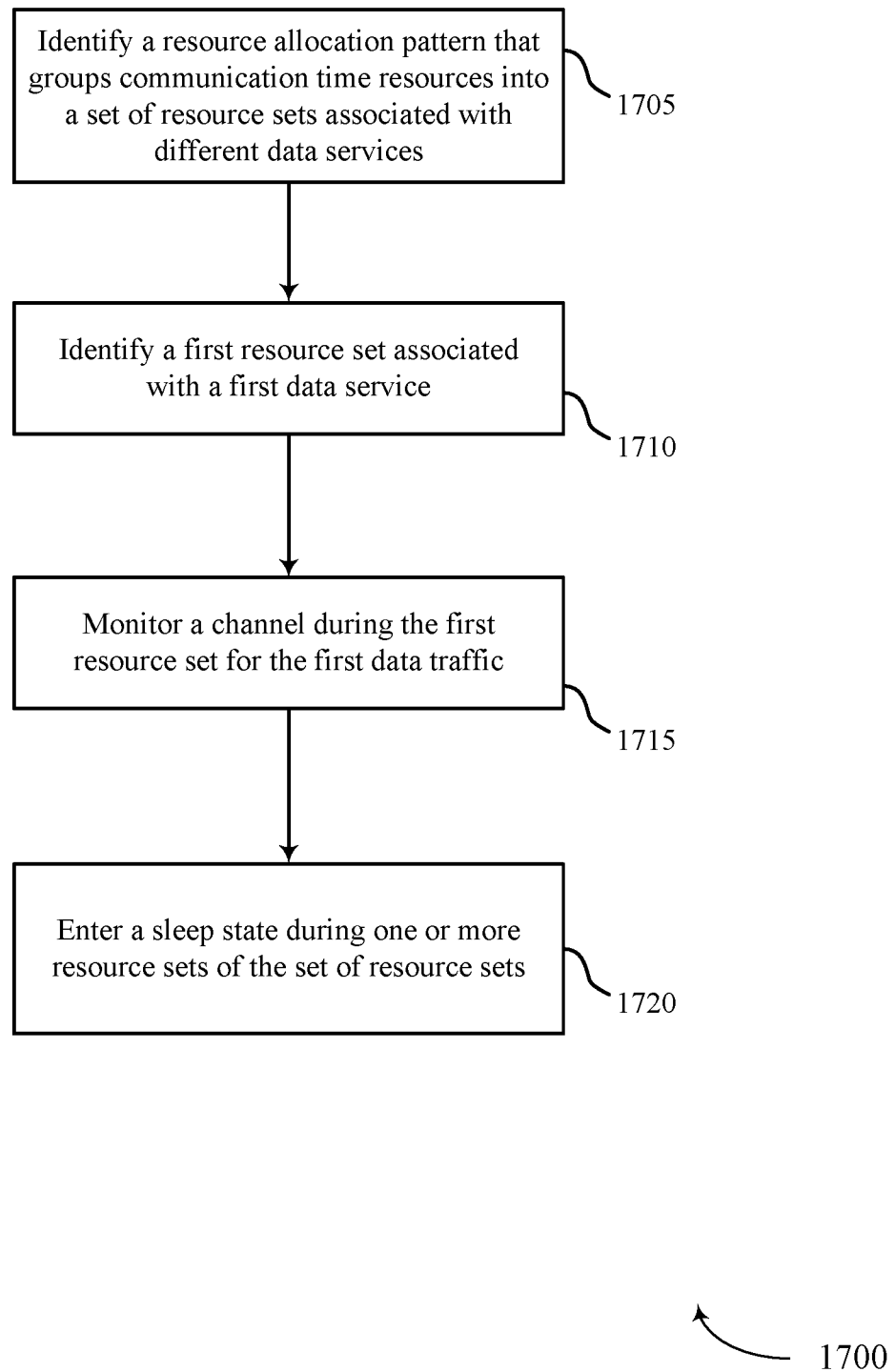

FIG. 17 shows a flowchart illustrating a method 1700 for quality of service related enhancements for LTE-U in accordance with various aspects of the present disclosure. The operations of method 1700 may be implemented by a UE 115 or its components as described with reference to FIGS. 1-6 and 11-14. For example, the operations of method 1700 may be performed by the LTE-U resource identifier 1010 as described with reference to FIGS. 11-14. In some examples, a processor may execute a set of codes to control the functional elements of the UE 115 to perform the functions described below. Additionally or alternatively, the UE 115 may perform aspects the functions described below using special-purpose hardware. The method 1700 may also incorporate aspects of method 1600 of FIG. 16.

At block 1705, the UE 115 may identify a resource allocation pattern for a carrier in a shared spectrum, wherein the resource allocation pattern groups communication time resources of the carrier into a plurality of resource sets associated with different data services as described with reference to FIGS. 2-6. In certain examples, the operations of block 1705 may be performed by the pattern identifier 1105 as described with reference to FIG. 11.

At block 1710, the UE 115 may identify a first resource set associated with a first data service of the different data services as described with reference to FIGS. 2-6. In certain examples, the operations of block 1710 may be performed by the resource set identifier 1110 as described with reference to FIG. 11.

At block 1715, the UE 115 may monitor a channel associated with the carrier during the first resource set for the first data traffic set as described with reference to FIGS. 2-6. In certain examples, the operations of block 1715 may be performed by the channel monitor 1205 as described with reference to FIG. 12.

At block 1720, the UE 115 may enter a sleep state during one or more resource sets of the plurality of resource sets as described with reference to FIGS. 2-6. In certain examples, the operations of block 1720 may be performed by the DRX module 1210 as described with reference to FIG. 12.

Figure 18:
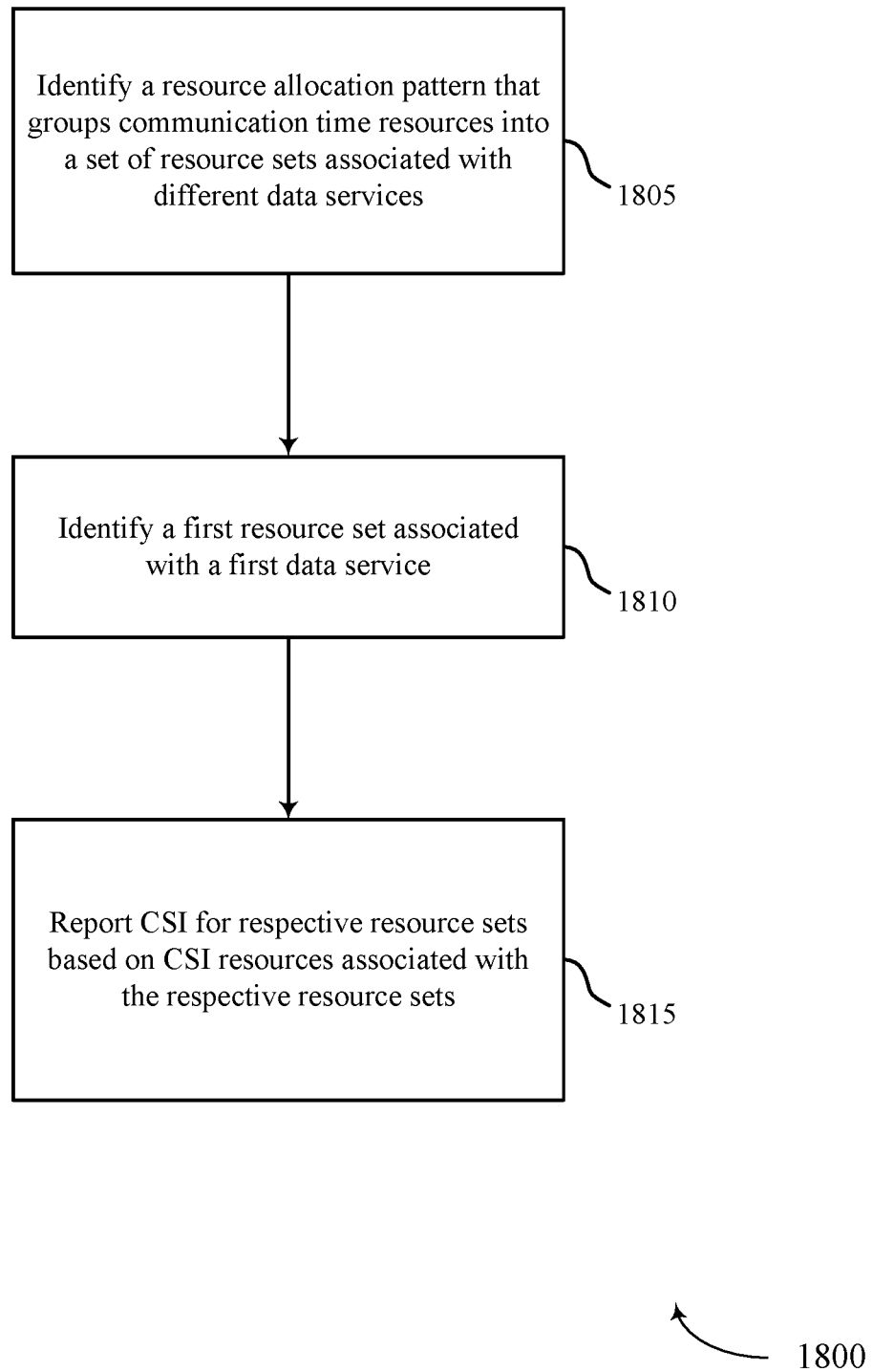

FIG. 18 shows a flowchart illustrating a method 1800 for quality of service related enhancements for LTE-U in accordance with various aspects of the present disclosure. The operations of method 1800 may be implemented by a UE 115 or its components as described with reference to FIGS. 1-6 and 11-14. For example, the operations of method 1800 may be performed by the LTE-U resource identifier 1010 as described with reference to FIGS. 11-14. In some examples, a processor may execute a set of codes to control the functional elements of the UE 115 to perform the functions described below. Additionally or alternatively, the UE 115 may perform aspects the functions described below using special-purpose hardware. The method 1800 may also incorporate aspects of methods 1600 or 1700 of FIG. 16 or 17.

At block 1805, the UE 115 may identify a resource allocation pattern for a carrier in a shared spectrum, wherein the resource allocation pattern groups communication time resources of the carrier into a plurality of resource sets associated with different data services as described with reference to FIGS. 2-6. In certain examples, the operations of block 1805 may be performed by the pattern identifier 1105 as described with reference to FIG. 11.

At block 1810, the UE 115 may identify a first resource set associated with a first data service of the different data services as described with reference to FIGS. 2-6. In certain examples, the operations of block 1810 may be performed by the resource set identifier 1110 as described with reference to FIG. 11.

At block 1815, the UE 115 may report CSI for respective resource sets of the plurality of resource sets, wherein the reported CSI is based at least in part on CSI resources associated with the respective resource sets as described with reference to FIGS. 2-6. In certain examples, the operations of block 1815 may be performed by the CSI reporter 1215 as described with reference to FIG. 12.

Thus, methods 1400, 1500, 1600, 1700, and 1800 may provide for quality of service related enhancements for LTE-U. It should be noted that methods 1400, 1500, 1600, 1700, and 1800 describe possible implementation, and that the operations and the steps may be rearranged or otherwise modified such that other implementations are possible. In some examples, aspects from two or more of the methods 1400, 1500, 1600, 1700, and 1800 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
    identifying a resource allocation pattern for a plurality of base stations, wherein the resource allocation pattern groups communication time resources of a carrier in a shared spectrum into a plurality of resource sets associated with different data service sets;
    identifying a first resource set associated with a first data service set of the different data service sets;
    determining a listen-before-talk (LBT) parameter based at least in part on the first data service set;
    performing a clear channel assessment (CCA) over the carrier based at least in part on the LBT parameter; and
    transmitting, over the first resource set, first data traffic associated with the first data service set based at least in part on a result of the CCA.

2. The method of claim 1, wherein the LBT parameter comprises a contention window size, a deferral period, a contention window adaptation scheme, an energy detection threshold, or any combination thereof.

3. The method of claim 1, wherein the identifying the resource allocation pattern comprises:
    receiving the resource allocation pattern from a network device associated with the plurality of base stations.

4. The method of claim 1, further comprising:
    broadcasting the resource allocation pattern to a radio access network, wherein the radio access network is associated with the plurality of base stations.

5. The method of claim 1, further comprising:
    transmitting, to at least one user equipment (UE), the resource allocation pattern.

6. The method of claim 1, wherein the communication time resources comprise a frame, a subframe, a symbol period, a transmission time interval (TTI), or any combination thereof.

7. The method of claim 1, wherein each of the plurality of resource sets comprises a plurality of contiguous communication time resources.

8. The method of claim 1, wherein the communication time resources are synchronized for the plurality of base stations.

9. The method of claim 1, wherein each of the different data service sets is associated with one or more quality of service (QoS) identifiers, one or more service type identifiers, or any combination thereof.

10. The method of claim 9, wherein at least one of the one or more service type identifiers is associated with a machine type communications (MTC) service.

11. The method of claim 1, further comprising:
    identifying a second resource allocation pattern for the plurality of base stations, wherein the second resource allocation pattern groups second communication time resources of a second carrier in the shared spectrum into a second plurality of resource sets associated with one or more of the different data service sets, and wherein the second plurality of resource sets are allocated differently than the plurality of resource sets.

12. The method of claim 1, further comprising:
    activating a type of hybrid automatic repeat request (HARM) process for transmission of the first data traffic based on the first data service set.

13. An apparatus for wireless communication, comprising:
    means for identifying a resource allocation pattern for a plurality of base stations, wherein the resource allocation pattern groups communication time resources of a carrier in a shared spectrum into a plurality of resource sets associated with different data service sets;
    means for identifying a first resource set associated with a first data service set of the different data service sets;
    means for determining a listen-before-talk (LBT) parameter based at least in part on the first data service set;
    means for performing a clear channel assessment (CCA) over the carrier based at least in part on the LBT parameter; and
    means for transmitting, over the first resource set, first data traffic associated with the first data service set based at least in part on a result of the CCA.

14. The apparatus of claim 13, wherein the means for identifying the resource allocation pattern comprises:
    means for receiving the resource allocation pattern from a network device associated with the plurality of base stations.

15. The apparatus of claim 13, further comprising:
    means for broadcasting the resource allocation pattern to a radio access network, wherein the radio access network is associated with the plurality of base stations.

16. The apparatus of claim 13, wherein the communication time resources are synchronized for the plurality of base stations.

17. An apparatus for wireless communication, comprising:
    a processor;
    memory in electronic communication with the processor; and
    instructions stored in the memory and operable, when executed by the processor, to cause the apparatus to:
        identify a resource allocation pattern for a plurality of base stations, wherein the resource allocation pattern groups communication time resources of a carrier in a shared spectrum into a plurality of resource sets associated with different data service sets;
        identify a first resource set associated with a first data service set of the different data service sets;
        determine a listen-before-talk (LBT) parameter based at least in part on the first data service set;
        perform a clear channel assessment (CCA) over the carrier based at least in part on the LBT parameter; and
        transmit, over the first resource set, first data traffic associated with the first data service set based at least in part on a result of the CCA.

18. The apparatus of claim 17, wherein the instructions operable to cause the apparatus to identify the resource allocation pattern further comprise instructions to cause the apparatus to:
    receive the resource allocation pattern from a network device associated with the plurality of base stations.

19. The apparatus of claim 17, wherein the LBT parameter comprises a contention window size, a deferral period, a contention window adaptation scheme, an energy detection threshold, or any combination thereof.

20. The apparatus of claim 17, wherein the instructions are operable to cause the apparatus to:
broadcast the resource allocation pattern to a radio access network, wherein the radio access network is associated with the plurality of base stations.

21. A method of wireless communication, comprising:
identifying a resource allocation pattern for a carrier in a shared spectrum, wherein the resource allocation pattern groups communication resources of the carrier across time into a plurality of time resource sets associated with different data service sets, wherein each data service set is associated with a quality of service (QoS) identifier or a service type identifier;
identifying a first time resource set associated with a first data service set of the different data service sets;
monitoring, over the first time resource set, a channel associated with the carrier for first data traffic that is associated with the first data service set; and
reporting one or more channel measurements of the channel for the first time resource set based at least in part on the monitoring.

22. The method of claim 21, further comprising:
entering a sleep state during one or more resource sets of the plurality of time resource sets.

23. The method of claim 21, wherein at least one of the plurality of time resource sets is associated with a UE-initiated transmission data service.

24. The method of claim 21, wherein reporting comprises:
reporting one or more channel quality indicator (CQI) measurements for respective time resource sets of the plurality of time resource sets, wherein the one or more CQI measurements are based at least in part on channel state information (CSI) resources associated with the respective time resource sets.

* * * * *